(12) United States Patent
Maruyama et al.

(10) Patent No.: US 9,716,456 B2
(45) Date of Patent: Jul. 25, 2017

(54) ROTARY ELECTRIC MACHINE CAPABLE OF DETECTING MALFUNCTION IN SWITCH

(71) Applicant: DENSO CORPORATION, Kariya, Aichi-pref. (JP)

(72) Inventors: Toshinori Maruyama, Anjo (JP); Takatoshi Inokuchi, Kariya (JP); Masaya Nakanishi, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 148 days.

(21) Appl. No.: 14/694,257

(22) Filed: Apr. 23, 2015

(65) Prior Publication Data

US 2015/0311848 A1    Oct. 29, 2015

(30) Foreign Application Priority Data

Apr. 23, 2014    (JP) .................................. 2014-088727

(51) Int. Cl.

| | | |
|---|---|---|
| *G01R 31/02* | (2006.01) | |
| *H02P 11/00* | (2006.01) | |
| *H02P 23/00* | (2016.01) | |
| *H02K 1/26* | (2006.01) | |
| *H02K 11/04* | (2016.01) | |
| *H02J 7/16* | (2006.01) | |
| *H02P 9/48* | (2006.01) | |
| *H02P 9/08* | (2006.01) | |

(52) U.S. Cl.
CPC .............. *H02P 23/00* (2013.01); *H02J 7/163* (2013.01); *H02K 1/26* (2013.01); *H02K 11/044* (2013.01); *H02P 9/48* (2013.01); *H02P 9/08* (2013.01)

(58) Field of Classification Search
CPC .. H02P 23/00; H02P 9/48; H02K 1/26; H02K 11/001; H02K 11/044; H02J 7/163
USPC ......................................................... 318/490
See application file for complete search history.

(56) References Cited

U.S. PATENT DOCUMENTS

| | | |
|---|---|---|
| 5,182,511 A | 1/1993 | Pierret et al. |
| 2011/0175580 A1 | 7/2011 | Asada et al. |
| 2012/0001598 A1 | 1/2012 | Horihata et al. |

(Continued)

FOREIGN PATENT DOCUMENTS

| | | |
|---|---|---|
| JP | H03-215200 A | 9/1991 |
| JP | 2010-512131 A | 4/2010 |
| JP | 2011-151903 A | 8/2011 |

(Continued)

*Primary Examiner* — Bentsu Ro
*Assistant Examiner* — Zemenay Truneh
(74) *Attorney, Agent, or Firm* — Oliff PLC

(57) ABSTRACT

In a rotary electric machine, a modulation signal generator generates a modulation signal including information indicative of rotation of a rotor based on change of a voltage at an output end of a stator winding, and outputs the modulation signal. A rectifying unit alternately turns on and off the switch to rectify the voltage at an output end of the stator winding, thus generating a rectified voltage. An excitation current supplying circuit is communicably connected to the modulation signal generator via a communication line, and starts a supply of an excitation current to the excitation winding of the rotor to induce a rotating magnetic field in the stator winding when the modulation signal output from the modulation signal generator is input thereto via the communication line.

24 Claims, 12 Drawing Sheets

(56) References Cited

U.S. PATENT DOCUMENTS

2012/0098503 A1* 4/2012 Horihata .................. H02P 9/08
  322/23
2012/0098670 A1 4/2012 Rechdan et al.

FOREIGN PATENT DOCUMENTS

| JP | 2012-016158 A | 1/2012 |
| JP | 2012-090454 A | 5/2012 |

* cited by examiner

ROTARY ELECTRIC MACHINE CAPABLE OF DETECTING MALFUNCTION IN SWITCH

CROSS REFERENCE TO RELATED APPLICATIONS

This application is based on and claims the benefit of priority from Japanese Patent Application 2014-088727 filed on Apr. 23, 2014, the disclosure of which is incorporated in its entirety herein by reference.

TECHNICAL FIELD

The present invention relates to rotary electric machines for generating electrical power and/or moving power, and more particularly, to such rotary electric machines capable of detecting a malfunction, i.e., an abnormality, in a switch.

BACKGROUND

One type of rotary electric machines includes at least one-phase stator winding of a stator, a field winding of a rotor, a rectifier including at least one switching element as at least one rectifying element, and a regulator to which an output end of the at least one-phase stator winding is connected. The regulator performs, for example, a power generation task as follows. Specifically, the regulator energizes the field winding of the rotor to magnetize poles of the rotor when the rotor is rotating, thus generating a rotating magnetic field. The rotating magnetic field induces at least one-phase AC power in the at least one-phase stator winding. The regulator controls on-off operations of the at least one switching element, thus rectifying the at least one-phase AC power to DC power, thus outputting the DC power.

Particularly, a regulator of a rotary electric machine of this type, which is disclosed in Japanese Patent Application Publication No. 2012-90454, detects rotation of the rotor based on at least one-phase voltage across the at least one-phase stator winding, and controls how to energize the field winding based on the detected results of rotation of the rotor. The regulator is connected to an ECU serving as an external controller via a communication line. This connection permits the ECU to instruct the regulator to
(1) Start the power generation task
(2) Control a level of the DC power output from the rotary electric machine during the power generation task.

SUMMARY

The output end of the at least one-phase stator winding is connected to the regulator of the rotary electric machine disclosed in the patent document 2012-90454. This connection permits the regulator to detect rotation of the rotor, and control how the field winding is energized based on the detected results of rotation of the rotor.

Alternately turning on and off of the at least one switching element of the rectifier may generate a high voltage, i.e., a surge, that may be superimposed on a voltage at the output end of the at least one-phase stator winding. An excessively high surge due to alternate turning on, and off of the at least one switching element may cause the regulator to malfunction.

An accidental communication failure or communication noise may disable the external controller, such as an ECU, from either starting the power generation task or controlling a level of the DC power output from the rotary electric machine during the power generation task.

In view of the circumstances set forth above, one aspect of the present invention seeks to provide rotary electric machines designed to address the points that should be improved set forth above.

Specifically, an alternative aspect of the present invention aims to provide such rotary electric machines, which are capable of reliably starting the supply of an excitation current to a stator winding to start a power generation task without external instructions with little influence from a surge occurring during the power generation task.

According to an exemplary aspect of the present invention, there is provided a rotary electric machine. The rotary electric machine includes a stator winding having an output end, a rotor including an excitation winding, a switch connected to the output end of the stator winding, and a modulation signal generator. The modulation signal generator is configured to generate a modulation signal including information indicative of rotation of the rotor based on change of a voltage at the output end of the stator winding and output the modulation signal. The rotary electric machine includes a rectifying unit configured to alternately turn on and off the switch to rectify the voltage at the output end of the stator winding, thus generating a rectified voltage. The rotary electric machine includes an excitation current supplying circuit communicably connected to the modulation signal generator via a communication line and configured to start a supply of an excitation current to the excitation winding of the rotor to induce a rotating magnetic field in the stator winding when the modulation signal output from the modulation signal generator is input thereto via the communication line.

The excitation current supplying unit of the rotary electric machine is configured to start supply of the excitation current to the excitation winding of the rotor when the modulation signal output from the modulation signal generator is input thereto via the communication line. This configuration eliminates the need to directly connect the output end of the stator winding to the excitation current supplying unit; the output end of the stator winding has a high risk of superimposition of surges due to switching of the switch. This elimination prevents the excitation current supplying unit from malfunctioning due to such surges.

The above and/or other features, and/or advantages of various aspects of the present disclosure will be further appreciated in view of the following description in conjunction with the accompanying drawings. Various aspects of the present disclosure can include and/or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Figure 1:
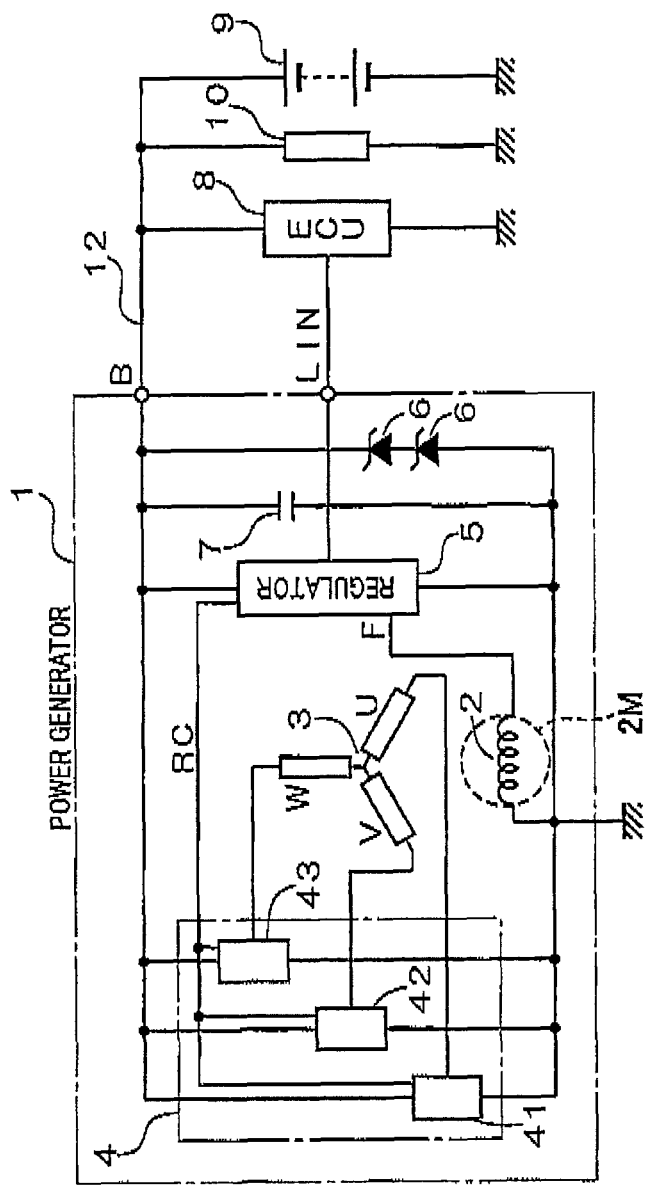
FIG. 1 is a circuit diagram schematically illustrating an example of the system configuration of a power generator according to the first embodiment of the present disclosure.

Embodiments of the present disclosure will be described hereinafter with reference to the accompanying drawings. In the drawings, identical reference characters are utilized to identify corresponding identical components.

First Embodiment

Referring to the drawings, particularly to FIG. 1, there is illustrated a three-phase power generator 1 according to the first embodiment of the present disclosure; the power generator 1 is an example of rotary electric machines. The power generator 1 according to the first embodiment is installed in a motor vehicle.

The power generator 1 includes a rotor 2M including a field winding, i.e., an excitation winding, 2, stator windings 3, a rectifier 4, a regulator 5 for controlling energization of the field winding 2, series-connected Zener diodes 6, and a capacitor 7.

The power generator 1 is operative to convert an alternating-current (AC) voltage induced in the stator windings 3 into a DC voltage via the rectifier 4, and supply the DC voltage to a battery 9 via a charge line 12 and an output terminal B to charge it therein, and/or the DC voltage to electrical loads 10 installed in the motor vehicle via the charge line 12 and the output terminal B.

The power generator 1 is also operative to convert a DC voltage supplied from the battery 9 into a three-phase AC voltage via the rectifier 4, and apply the three-phase AC voltage to the stator windings 3 to thereby generate rotary power (torque) to rotate the rotor 2M. For example, the rotor 2M is directly or indirectly coupled, via a belt, to a crankshaft of an internal combustion engine, referred to simply as an engine, installed in the motor vehicle so that the generated rotary power turns the crankshaft of the engine.

The stator windings 3 are for example three-phase stator windings as an example of multiphase stator windings. The stator windings 3 are wound in and around a cylindrical stator core. For example, the stator core has an annular shape in its lateral cross section, and a plurality of slots formed therethrough and circumferentially arranged at given pitches. The stator windings 3 are wound in the slots of the stator core. The stator windings 3 and the stator core constitute a stator of the power generator 1.

The stator windings 3 consist of U-, V-, and W-phase windings, which are connected in, for example, a star configuration. The U-, V-, and W-phase windings each have one end connected to a common junction (neutral point), and the other end serving as an output end.

The rotor 2M is attached to, for example, a rotary shaft (not shown) and, for example, rotatably disposed within the stator core. One end of the rotary shaft is linked to directly or indirectly to the crankshaft of the engine such that the rotor 2M and the rotary shaft are rotatably driven by the engine. In other words, rotation of the rotor 2M can be transferred to the crankshaft of the engine as rotary power so that the crankshaft can be rotated by the rotary power.

The rotor 2M includes a plurality of field poles disposed to face the inner periphery of the stator core, and the field winding 2 wound in and around the field poles. The field winding 2 is electrically connected to the regulator 5 via slip rings and the like. When energized by the regulator 5, the field winding 2 magnetizes the field poles with alternative north and south polarities while the rotor 2M is rotating to thereby generate a rotating magnetic field. Note that, as the rotor 2M, a rotor comprising permanent magnets or a salient-pole rotor for generating a rotating magnetic field can be used. The rotating magnetic field induces an AC voltage in the stator windings 3.

The rectifier 4 is connected to the stator windings 3 and disposed between the stator windings 3 and the battery 9. The rectifier 4 is constructed as a three-phase full-wave rectifier (bridge circuit) as a whole. The rectifier 4 is operative to convert three-phase AC voltages, i.e., three-phase AC currents, induced in the stator windings into a DC voltage, i.e., a direct current.

The rectifier 4 includes a number, such as three, of rectifier modules 41, 42, and 43 corresponding to the number of phase of the stator windings 3. The rectifier module 41 is connected to the output end of the U-phase winding in the stator windings 3, the rectifier module 42 is connected to the output end of the V-phase winding in the stator windings 3, and the rectifier module 43 is connected to the output end of the W-phase winding in the stator windings 3.

Each of the three rectifier modules 41, 42, and 43 and the regulator 4 are communicably connected to each other via a communication line RC serving as a first communication line.

The regulator 5 has a terminal F connected to the field winding 2. The regulator 5, which is designed as an excitation current supplying unit, controls an excitation current, i.e., a field current, to be supplied to the field winding 2 according to a rectified output voltage of the rectifier 4, thus regulating an output voltage Vb of the power generator 1, i.e., an output voltage of each rectifier module, to a target regulated voltage Vreg that is, for example, set to be higher than a battery voltage, i.e., a DC voltage output from the battery 9.

For example, when the output voltage Vb becomes higher than the target regulated voltage Vreg, the regulator 5 stops the supply of the excitation current to the filed winding 2, or reduce the value of the excitation current supplied to the field winding 2. When the output voltage Vb becomes lower than the target regulated voltage Vreg, the regulator 5 restart the supply of the filed current to the field winding 2, or increase the value of the field current supplied to the field winding 2. These operations of the regulator 5 regulate the output voltage Vb to the target regulated voltage Vreg.

The regulator 5 is communicably connected to an ECU, i.e., external controller, 8 via a communication line and a communication terminal L of the power generator 1. The regulator 5 is operative to carry out serial bidirectional communications, such as local interconnect network (LIN) communications in accordance with LIN protocols, with the ECU 8, thus sending and/or receiving communication messages to and/or from the ECU 8. The regulator 5 can be designed to send and/or receive communication messages to and/or from the ECU 8 in accordance with one of other communication protocols, such as controller area network (CAN) protocols.

The series-connected Zener diodes 6 are connected between the output terminal B of the power generator 1 and a common signal ground of the power generator 1 in parallel to each rectifier module 41, 42, and 43.

Specifically, the cathode of the series-connected Zener diodes 20 is connected to the output terminal B of the power generator 1, and the anode thereof is connected to the common signal ground. The series-connected Zener diodes 20 are operative to absorb an instantaneous high surge due to, for example, load dump, thus protecting the rectifier modules 41, 42, and 43.

The capacitor 7 is connected between the output terminal B and the common signal ground of the power generator 1 in parallel to each rectifier module 41, 42, and 43. The capacitor 7 is operative to suppress or absorb noise occurring in the output terminal B of the power generator 1.

Next, an example of the structure of each of the rectifier modules 41, 42, and 43 according to the first embodiment will be described in detail hereinafter.

Figure 2:
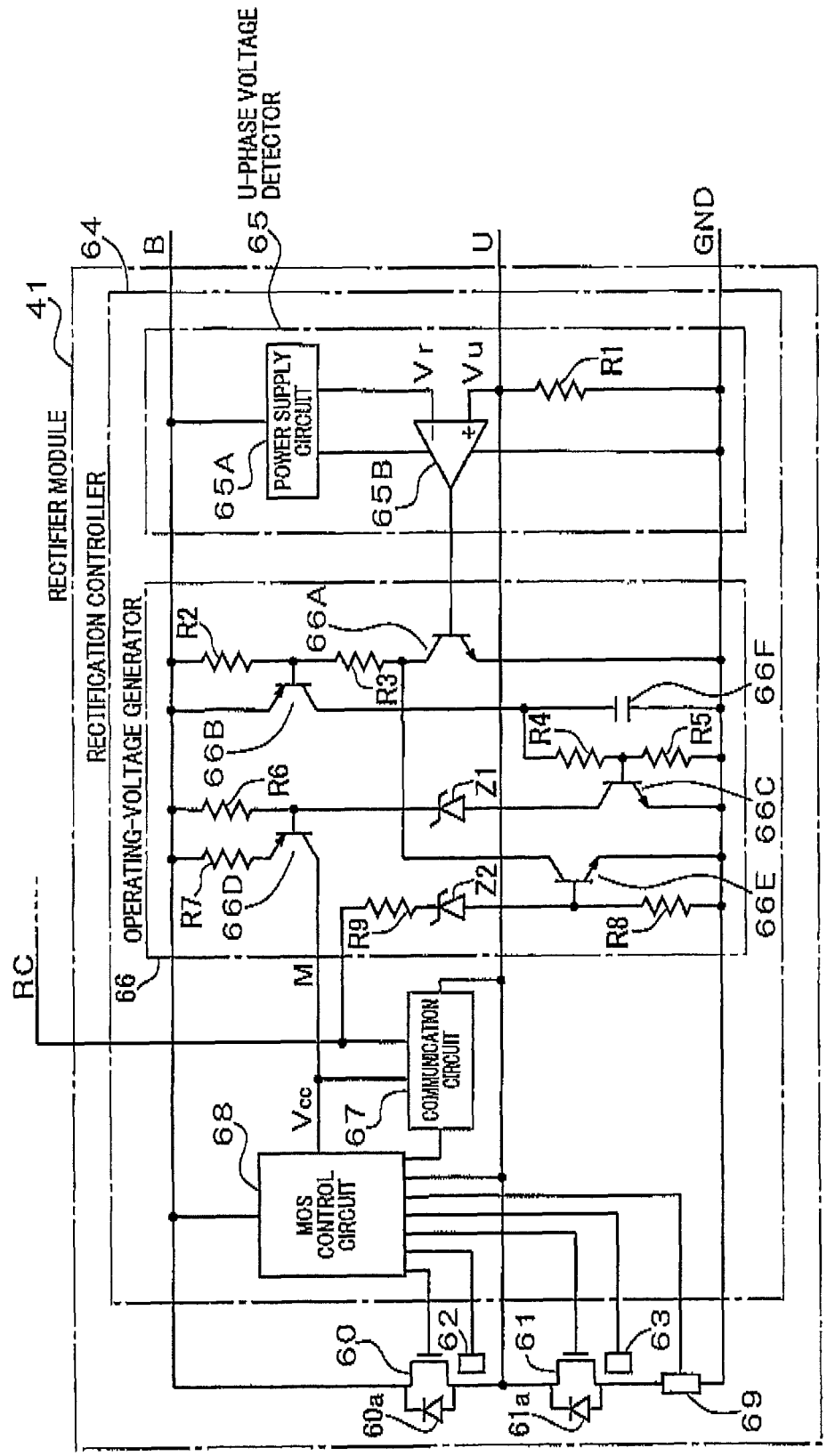
FIG. 2 is a circuit diagram schematically illustrating an example of the structure of a rectifier module for a U-phase winding illustrated in FIG. 1.

Referring to FIG. 2, the rectifier module 41 for the U-phase winding includes first and second MOS transistors 60 and 61 serving as a switch, first and second temperature sensors 62 and 63, a rectification controller 64, and a current sensor 69.

The source of the first MOS transistor 60 is connected to the output end of the U-phase winding, and the drain is connected to a positive terminal of the battery 9 and the electrical loads 10 via the charge line 12 (see FIG. 1). The connection of the first MOS transistor 60 to the positive terminal of the battery 9 serves the first MOS transistor 60 as an upper-arm, i.e., a high-side, switching element.

In addition, the drain of the second MOS transistor 61 is connected to the output end of the U-phase winding, and the source is connected to a negative terminal of the battery 9 via the common signal ground of the power generator 1. The connection of the second MOS transistor 61 to the negative terminal of the battery 9 serves the second MOS transistor 61 as a lower-arm, i.e., a low-side, switching element.

An intrinsic diode, in other words, a body diode, 60a is intrinsically provided in the first MOS transistor 60 to be connected in antiparallel to the first MOS transistor 60. That is, the anode of the intrinsic diode 60a is connected to the source of the first MOS transistor 60, and the cathode is connected to the drain thereof.

An intrinsic diode, in other words, a body diode, 61a is intrinsically provided in the second MOS transistor 61 to be connected in antiparallel to the second MOS transistor 61. That is, the anode of the intrinsic diode 61a is connected to the source of the second MOS transistor 61, and the cathode is connected to the drain thereof.

In other words, the first and second MOS transistors 60 and 61 are connected to each other in series via a connecting point, and the output end of the U-phase winding is connected to the connecting point between the source of the first MOS transistor 60 and the drain of the second MOS transistor 61.

Note that an additional diode can be connected in antiparallel to each of the first and second MOS transistors 60 and 61. A switching element different in type from the MOS-transistor type can be used as at least one of the first and second MOS transistors 60 and 61. In this modification, a diode is added to be connected in antiparallel to the switching element.

The first temperature sensor 62 is disposed to be close to the first MOS transistor 60, and measures the temperature of the first MOS transistor 60. The first temperature sensor 62 can be disposed as a discrete component with respect to the first MOS transistor 60, or can be packaged together with the first MOS transistor 60.

The second temperature sensor 63 is disposed to be close to the second MOS transistor 61, and measures the temperature of the second MOS transistor 61. The second temperature sensor 63 can be disposed as a discrete component with respect to the second MOS transistor 61, or can be packaged together with the second MOS transistor 61.

Each of the first and second temperature sensors 62 and 63 outputs, to each of the rectifier modules 41 to 43, a signal indicative of the measured temperature.

The current sensor 69 is operative to determine whether a current, i.e., a U-phase current, is flowing through the U-phase winding, and/or measure a value of the U-phase current. For example, the current sensor 69 has a shunt resistor connected between the source of the second MOS transistor 61 and the common signal ground of the power generator 1. The current sensor 69 measures a voltage across the shunt resistor. Then, the current sensor 69 determines whether the U-phase current is flowing through the U-phase winding, and measures a value of the U-phase current based on the measured voltage. The current sensor 69 outputs a signal including information indicative of whether the U-phase current is flowing through the U-phase winding and the value of the U-phase current to, for example, each of the rectifier modules 41 to 43.

The rectification controller 64 includes, for example, a U-phase so voltage detector 65, an operating-voltage generator 66, a communication circuit 67, and a MOS control circuit 68.

The U-phase voltage detector 65 is operative to measure a U-phase voltage Vu at the output end of the U-phase winding. For example, the U-phase voltage detector 65 includes a power supply circuit 65A, a voltage comparator 65B, and a resistor R1.

The power supply circuit 65A is connected to the output terminal B of the power generator 1 and the voltage comparator 65B. The power supply circuit 65A generates, based on a voltage at the output terminal B of the power generator 1, an operating voltage for the voltage comparator 65B, and a predetermined threshold voltage yr.

The voltage comparator 65B has a first input terminal connected to the power supply circuit 65A, a second input terminal connected to the output end of the U-phase winding, and an output terminal connected to the operating-voltage generator 66. The voltage comparator 65B operates, based on the operating voltage supplied from the power supply circuit 65A, to compare the threshold voltage Vr supplied from the power supply circuit 65A via the first input terminal with the U-phase voltage Vu at the second input terminal.

The voltage comparator 65B outputs, based on the compared results, a high level signal when the U-phase voltage Vu is equal to or higher than the threshold voltage Vr. The voltage comparator 65B also outputs, based on the compared results, a low level signal when the U-phase voltage Vu is lower than the threshold voltage Vr. The threshold voltage Vr is determined to a value sufficient for the voltage comparator 65B to detect a minute value of the U-phase voltage Vu to thereby output the high level signal when the rotor 2M starts to rotate, based on a remanent magnetization in the poles of the rotor 2M, while no excitation current is flowing through the field winding 2.

The U-phase voltage, which is a periodic AC voltage, causes the amplitude thereof to periodically exceed the threshold voltage Vr. This periodic amplitude of the U-phase voltage causes the output of the voltage comparator 65B to periodically change between the low level signal and the high level signal; the periodic change of the output of the voltage comparator 65B depends on the RPM Na of the rotor 2M, i.e., the rotational speed of the rotor 2M. The resistor R1 is connected between the output end of the U-phase winding and the common signal ground of the power generator 1. The resistor R1 serves as, for example, a pull down resistor to set the output of the voltage comparator 55B to the low level signal if no minute value of the U-phase voltage appears at the output end of the U-phase winding.

The operating-voltage generator 66 includes, for example, transistors 66A to 66E, a capacitor 66F, resistors R2 to R9, and Zener diodes Z1 and Z2. For example, NPN transistors are used for the respective transistors 66A, 66C, and 66E, and PNP transistors are used for the respective transistors 66B and 66E.

The base, i.e., a control terminal, of the transistor 66A is connected to the output terminal of the voltage comparator 65B. The collector, i.e., a first terminal, of the transistor 66A is connected to a first end of series-connected resistors R2 and R3, and the emitter, i.e., a second terminal, of the transistor 66A is connected to the common signal ground. A second end, opposite to the first end, of the series-connected resistors R2 and R3 is connected to the output terminal B of the power generator 1. The connection point between the resistors R2 and R3 is connected to the base, i.e., a control terminal, of the transistor 66B. The emitter, i.e., a first terminal, of the transistor 66B is connected to the output terminal B of the power generator 1, and the collector, i.e., a second terminal, of the transistor 66B is connected to a first electrode of the capacitor 66F. A second electrode, which faces the first electrode, is connected to the common signal ground of the power generator 1.

A connection line between the collector of the transistor 66B and the first electrode of the capacitor 66F is connected to a first end of series-connected resistors R4 and R5. A second end, opposite to the first end, of the series-connected resistors R4 and R5 is connected to the common signal ground of the power generator 1. A connection point between the series-connected resistors R4 and R5 is connected to the base, i.e., a control terminal, of the transistor 66C. A first end of the resistor R6 is connected to the output terminal B of the power generator 1, and a second end, opposite to the first end, of the resistor R6 is connected to the cathode of the Zener diode Z1. The anode of the Zener diode Z1 is connected to a first terminal of the transistor 66C. The emitter, i.e., a second terminal, of the transistor 66C is connected to the common signal ground of the power generator 1.

A first end of the resistor R7 is connected to the output terminal B of the power generator 1, and a second end, opposite to the first end, of the resistor R7 is connected to the emitter, i.e., a first terminal, of the transistor 66D. The base, i.e., a control terminal, of the transistor 66D is connected to a point located between the second end of the resistor R6 and the cathode of the Zener diode Z1. The collector, i.e., a second terminal, of the transistor 66D is connected to the MOS control circuit 68 and the communication circuit 67.

A connection line between the first end of the series-connected resistors R2 and R3 and the first terminal of the transistor 66A is connected to the collector, i.e., a first terminal, of the transistor 66E. The emitter, i.e., a second terminal, of the transistor 66Z is connected to the common signal ground of the power converter 1. The base, i.e., a control terminal, of the transistor 66E is connected to a first end of the resistor R8. A second end, opposite to the first end, of the resistor 66E is connected to the common signal ground of the power converter 1. A connection point between the base of the transistor 66E and the first end of the resistor R8 is connected to the anode of the Zener diode Z2. The cathode of the Zener diode Z2 is connected to a first end of the resistor R9, and a second end, opposite to the first end, of the resistor R9 is connected to the communication line RC connecting between the rectifier 41 and the regulator 4.

Next, operations of the operating-voltage generator 66 will be described hereinafter.

Inputting the high level signal from the voltage comparator 65B to the base of the transistor 66A turns on the transistor 66A. The turn-on of the transistor 66A causes a base current to flow from the base of the transistor 66B via the transistor 66A to the common signal ground of the power converter 1, turning on the transistor 66B. The turn-on of the transistor 66B connects the capacitor 66F to the output terminal B of the power generator 1, charging the capacitor 66F based on the voltage at the output terminal B of the power generator 1. That is, periodic detection of the U-phase voltage Vu equal to or higher than the threshold voltage Vr causes the capacitor 66F to be charged in the same period, resulting in a gradual increase of a voltage across the capacitor 66F. The voltage across the capacitor 66F reaching a predetermined value causes a base current to flow to the base of the transistor 66C, turning on the transistor 66C.

When the voltage at the output terminal B of the power converter 1 becomes higher than a Zener voltage of the Zener diode Z1 with the turn-on of the transistor 66C, a base current flows from the base of the transistor 66D to the common signal ground via the Zener diode Z1, turning on the transistor 66D. The turn-on of the transistor 66D causes a voltage based on the voltage at the output terminal B of the power converter 1 to be supplied to the MOS control circuit 68 and the communication circuit 67 via an output terminal (see reference character M) as an operating voltage Vcc.

In addition, connection of the Zener diode Z2 to the communication line RC via the resistor R9 permits one of predetermined PWM signals as an example of modulation signals including first to third PWM signals described later, to input to the Zener diode Z2 from the outside of the rectifier module 41 via the resistor R9. A PWM signal is a cyclic pulse signal having a controllable duty factor; the duty factor is expressed as a ratio, i.e. percentage, of high-level duration to the total duration, i.e., a high-and-low level duration, of each cycle. The high level of each of the predetermined PWM signals is set to be higher than a Zener voltage of the Zener diode Z2.

Specifically, inputting one of the predetermined PWM signals to the Zener diode Z2 from the outside of the rectifier module 41 via the resistor R9 turns on the transistor 66E during each high-level duration of one of the predetermined PWM signals. Turn-on of the transistor 66E causes a base current to flow from the base of the transistor 66B to the common signal ground of the power generator 1 via the transistor 66E, turning on the transistor 66B. The turn-on of the transistor 66B connects the capacitor 66F to the output terminal B of the power generator 1, charging the capacitor 66F based on the voltage at the output terminal B of the power generator 1.

That is, cyclic occurrence of the high level of one of the predetermined PWM signals causes the capacitor 66F to be charged at the same cycle, resulting in a gradual increase of a voltage across the capacitor 66F. The voltage across the capacitor 66F reaching a predetermined value causes a base current to flow to the base of the transistor 66C, turning on the transistor 66C.

When the voltage at the output terminal B of the power converter 1 becomes equal to or higher than the Zener voltage of the Zener diode Z1 with the turn-on of the transistor 66C, a base current flows from the base of the transistor 66D to the common signal ground via the Zener diode Z1, turning on the transistor 66D. The turn-on of the transistor 66D causes a voltage based on the voltage at the output terminal B of the power converter 1 to be supplied to the MOS control circuit 68 and the communication circuit 67 via the output terminal M as the operating voltage Vcc.

The communication circuit 67 is activated, based on the operating voltage Vcc supplied thereto from the operating-voltage generator 66. When activated, the communication circuit 67, which serves as a modulation signal generator, transmits and/or receives a PWM signal according to how the rotor 2M is turned and/or how three-phase AC voltages are induced in the stator windings 3, and determine whether there is a malfunction in at least one of the MOS transistors 60 and 61.

Figure 3:
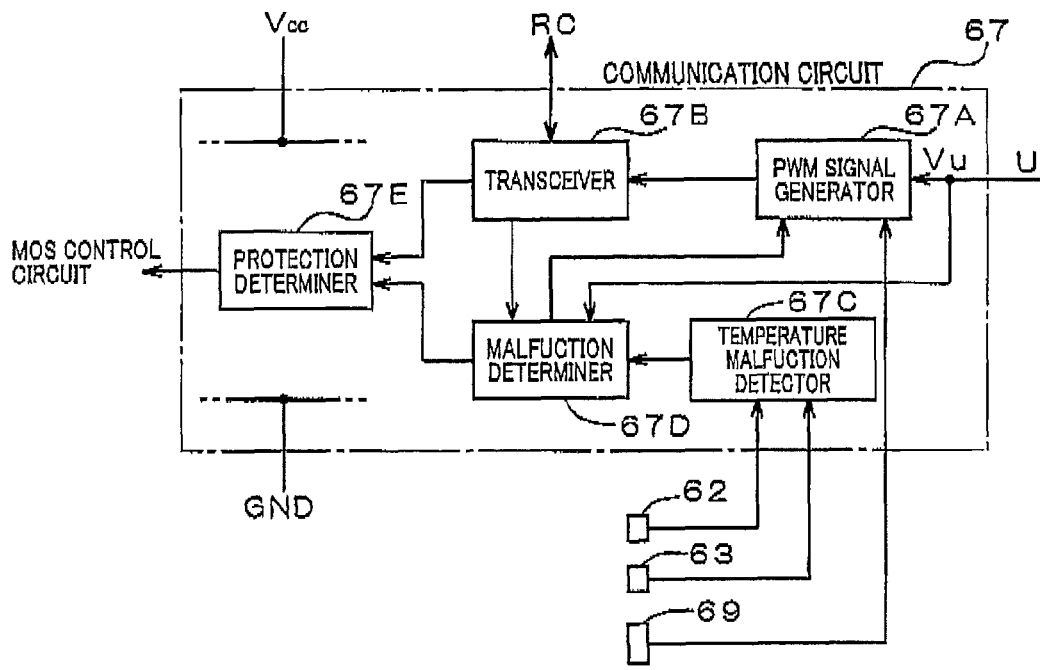
FIG. 3 is a block diagram schematically illustrating a communication circuit of the rectifier module illustrated in FIG. 2.

For example, referring to FIG. 3, the communication circuit 67 includes a PWM signal generator 67A, a transceiver 67B, a temperature-malfunction detector 67C, a malfunction determiner 67D, and a protection determiner 67E. For example, the communication circuit 67 can be designed as a microcomputer unit (programmed logic unit) comprised of at least a CPU and a memory, and these operating blocks 67A to 67E can be implemented by running, by the CPU, at least one program stored in the memory. As another example, the communication circuit 67 can be designed as a hardware circuit comprised of hardware units respectively corresponding to the operating blocks 67A to 67E, or as a hardware/software hybrid circuit, some of these functional blocks are implemented by some hardware units, and the remaining functional blocks are implemented by software to be run by the CPU.

To the PWM signal generator 67A, the U-phase voltage Vu is applied. The PWM signal generator 67A generates the first PWM signal when the U-phase voltage Vu exceeds a first threshold voltage Vth1; the first PWM signal has a frequency depending on the periodic change in the U-phase voltage Vu.

Specifically, the first PWM signal is used to detect, based on a minute value of the U-phase voltage Vu, rotation of the rotor 2M when the rotor 2M starts to rotate, based on a remanent magnetization in the poles of the rotor 2M, while no excitation current is flowing through the field winding 2. The first threshold value Vth1 is determined to a value sufficient for the PWM signal generator 67A to detect rotation of the rotor 2M based on a remanent magnetization in the poles of the rotor 2M while no excitation current is flowing through the field winding 2.

Figure 4:
FIG. 4 is a view schematically illustrating an example of a first PWM signal generated by the communication circuit.

FIG. 4 illustrates an example of the first PWM signal. The first PWM signal illustrated in FIG. 4 is a pulse signal having a frequency that varies in proportion to the frequency of the U-phase voltage Vu, a duty factor of 50%, and the high level of 5 V in pulse height.

As described later, when detecting the first PWM signal, the regulator 5 starts to energization of the filed winding 2. For example, the regulator 5 starts to supply the excitation current to the field winding 2 and increases the excitation current for, for example, several seconds until the output voltage Vb reaches the target regulated voltage Vreg.

The PWM signal generator 67A also generates the second PWM signal when the U-phase voltage Vu exceeds a second threshold voltage Vth2 or a U-phase current is generated to output from the output end of the U-phase winding. For example, the PWM signal generator 67A is capable of detecting generation of the U-phase current based on the signal output from the current sensor 69. The PWM signal generator 67A can be configured to measure a drain-source voltage of each of the MOS transistors 60 and 61, and detect generation of the U-phase current based on the measured drain-source voltages of the respective MOS transistors 60 and 61.

The second PWM signal has a frequency depending on the periodic change in the U-phase voltage Vu. Specifically, the second PWM signal is used to determine whether the power generator 1 has started normal, i.e., typical, power-generation operations. The second threshold value Vth2 is determined to a value higher than the first threshold voltage Vth1. For example, the second threshold value Vth2 is set to a value about half of the output voltage Vb that should be output from the power generator 1 while the power generator 1 is performing the normal power-generation operations, i.e., the power generator 1 is performing power-generation operations while no abnormalities, i.e., no malfunctions, have occurred in the power generator 1.

Figure 5:
FIG. 5 is a view schematically illustrating an example of a second PWM signal generated by the communication circuit.

FIG. 5 illustrates an example of the second PWM signal. The second PWM signal illustrated in FIG. 5 is a pulse signal having a frequency that is proportional to the frequency of the U-phase voltage Vu, a duty factor of 50%, and the high level being set to the output voltage Vb in pulse height.

The pulse height, which means a voltage variation range, of the second PWM signal is different from that of the first PWM signal. This is because the battery voltage is set to be higher than 5 V and the target regulated voltage Vreg is set to be higher than the battery voltage while the power generator 1 is performing the normal power-generation operations, so that the output voltage Vb of the power generator 1 at the output terminal B is higher than 5 V.

Figure 6:
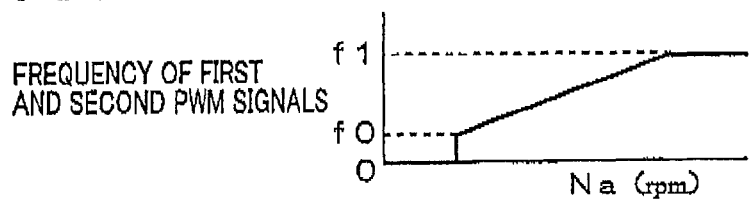
FIG. 6 is a graph schematically illustrating an example of the relationship between frequency of each of the first and second PWM signals and rotational speed of a rotor of the power generator.

Referring to FIG. 6, the frequency of each of the first and second PWM signals continuously varies within a predetermined frequency range between a lower limit f0 and an upper limit f1 inclusive; the frequency range matches with a rotational-speed range of the RPM Na of the rotor 2M between Na(0) to Na(1) inclusive.

As described later, when detecting the second PWM signal, the regulator 5 starts to perform an excitation-current control task for stabilizing the output voltage Vb of the power generator 1 rectified by the rectifier 4.

The PWM signal generator 67A further generates the third PWM signal when there are one or more malfunctions, i.e., abnormalities, in at least one of the MOS transistors 60 and 61. Malfunctions in at least one of the MOS transistors 60 and 61 include, for example, a malfunction due to abnormal change in the temperature of at least one of the MOS transistors 60 and 61, and a malfunction due to a short circuit across at least one of the MOS transistors 60 and 61.

Figure 7:
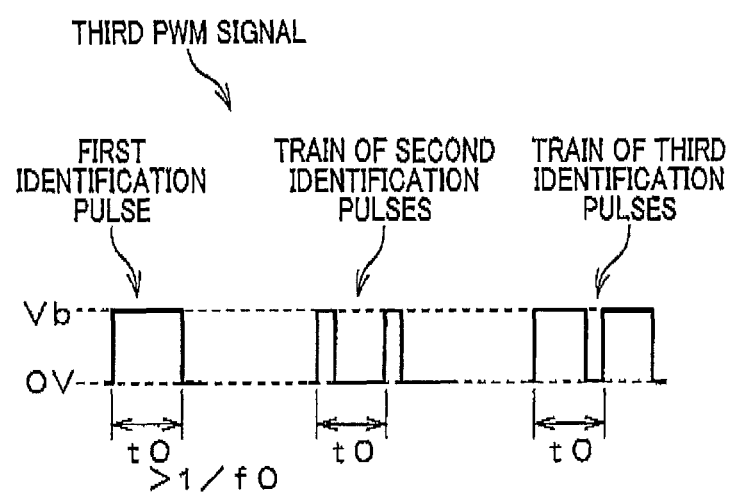
FIG. 7 is a view schematically illustrating an example of a third PWM signal generated by the communication circuit.

FIG. 7 illustrates an example of the third PWM signal. The third PWM signal illustrated in FIG. 7 includes a pulse, referred to as a first identification pulse, whose modulated width (modulated duration) t0 is for example, longer than the maximum period of each of the first and second PWM signals; the maximum period is the reciprocal of the lower limit f0 of the frequency of each of the first and second PWM signals. The reciprocal of the lower limit f0 of the frequency of each of the first and second PWM signals is represented as 1/f0. The first identification pulse represents the occurrence of a malfunction in at least one of the MOS transistors 60 and 61.

The third PWM signal also includes, after the first identification pulse, at least one of the train of second identification pulses and the train of third identification pulses.

Each second identification pulse identifies that there is a malfunction in the lower-arm. MOS transistor 61, and, for example, has a period matching with the duration t0 of the first identification pulse, a duty factor being set to a value, such as 20%, less than 50%, and the high level being set to the output voltage Vb in pulse height.

Each third identification pulse identifies that there is a malfunction in the upper-arm MOS transistor 60, and, for example, has a period matching with the duration to of the first identification pulse, a duty factor being set to a value, such as 80%, more than 50%, and the high level being set to the output voltage Vb in pulse height.

The transceiver 67B of the communication circuit 67 of the rectifier module 41 receives the first PWM signal, the second PWM signal, or the third PWM signal output from the PWM signal generator 67A, and transmits the received first, second or third PWM signal via the communication line RC. The transceiver 67B also receives the second PWM signal or the third PWM signal output from another rectifier module via the communication line RC, or receives a fourth PWM signal sent from the regulator 5 to the communication line RC. More information about the fourth PWM signal will be described later.

For example, when receiving the first or second PWM signal generated by the PWM signal generator 67A, the transceiver 67B monitors the communication line RC, and checks, based on the monitored results, whether no PWM signals are being transmitted via the communication line RC from another rectifier module. After determining that no PWM signals are being transmitted via the communication line RC from another rectifier module, the transceiver 67B transmits the first or second PWM signal generated by the PWM signal generator 67A via the communication line RC. This monitoring and checking operations of the transceiver 67B prevents a PWM signal transmitted therefrom from colliding with another PWM signal transmitted from another rectifier module. In addition, when receiving the third PWM signal generated by the PWM signal generator 67A, the transceiver 67B analyzes the third PWM signal, and identifies where a malfunction has occurred in the rectifier module 41, i.e., whether a malfunction has occurred in at least one of the MOS transistors 60 and 61. Then, the PWM signal generator 67A outputs, to the protection determiner 67E, information indicative of the identified result, i.e., which of the MOS transistors 60 and 61 has had a malfunction.

The transceiver 67B also transmits, to the malfunction determiner 67D, a notification, such as a message, indicative of the receipt of the second PWM signal when receiving the second PWM signal output from the PWM signal generator 67A.

The temperature-malfunction detector 67C monitors the signals output from the respective first and second temperature sensors 62 and 63, and determine whether the measured temperature of at least one of the MOS transistors 60 and 61 has exceeded a predetermined upper limit up to which the at least one of the MOS transistors 60 and 61 can operate normally. If it is determined that the measured temperature of at least one of the MOS transistors 60 and 61 has exceeded the predetermined upper limit, the temperature-malfunction detector 67C detects that a temperature malfunction has occurred in the at least one of the MOS transistors 60 and 61. Then, the temperature-malfunction detector 67C outputs, to the malfunction determiner 67D, the detected result.

The malfunction determiner 67D monitors the U-phase voltage Vu after determining that the power generator 1 has started normal power-generation operations, i.e., after receiving the notification transmitted from the transceiver 67B. The malfunction determiner 67D determines whether the value of the U-phase voltage Vu is (1) Equal to or higher than a first reference value for a first predetermined period (2) Equal to or lower than a second reference value for a second predetermined period.

The first reference value is set to a value that allows the malfunction determiner 67D to reliably detect a short circuit across the upper-arm MOS transistor 60. For example, the first reference value can be set to be slightly lower than the battery voltage. The second reference value is set to a value that permits the malfunction determiner 67D to reliably detect a short circuit across the lower-arm MOS transistor 61. For example, the second reference voltage can be set to be slightly higher than the ground voltage.

When it is determined that the value of the U-phase voltage Vu is equal to or higher than the first reference value for the first predetermined period, the malfunction determiner 67D determines that a malfunction due to a short circuit across the upper-arm MOS transistor 50 has occurred. When it is determined that the value of the U-phase voltage Vu is equal to or lower than the second reference value for the second predetermined period, the malfunction determiner 67D determines that a malfunction due to a short circuit across the lower-arm MOS transistor 61 has occurred.

When determining that a malfunction due to a short circuit across the upper-arm MOS transistor 60 has occurred, or receiving the detected result, which represents a temperature malfunction has occurred in the MOS transistor 60, sent from the temperature-malfunction detector 67C, the malfunction determiner 67D notifies both the PWM signal generator 67A and the protection determiner 67E of first information indicative of the occurrence of a malfunction in the MOS transistor 60.

As described above, when receiving the first information notified by the malfunction determiner 67D, the PWM signal generator 67A generates the third PWM signal having the first indication pulse and, after the first indication pulse, the third indication pulse having the period matching with the duration t0 of the first identification pulse, the duty factor being set to be a value more than 50%, and the high level being set to the output voltage Vb in pulse height.

Similarly, when determining that a malfunction due to a short circuit across the lower-arm MOS transistor 61 has occurred, or receiving the detected result, which represents a temperature malfunction has occurred in the MOS transistor 61, sent from the temperature-malfunction detector 67C, the malfunction determiner 67D notifies both the PWM signal generator 67A and the protection determiner 67E of second information indicative of the occurrence of a malfunction in the MOS transistor 61.

As described above, when receiving the second information notified by the malfunction determiner 67D, the PWM signal generator 67A generates the third PWM signal having the first indication pulse and, after the first indication pulse, the second indication pulse having the period matching with the duration t0 of the first identification pulse, the duty factor being set to be a value less than 50%, and the high level being set to the output voltage Vb in pulse height.

The protection determiner 67E is connected to the MOS control circuit 58. The protection determiner 67E determines whether and how to perform a protection operation for the power generator 1 according to information sent from the malfunction determiner 67D and/or a PWM signal sent from the transceiver 67B.

For example, the protection determiner 67E identifies that a malfunction has occurred in the MOS transistor 60 when receiving one of 1. The first information notified by the malfunction determiner 67D 2. The third indication pulse included in the third PWM signal.

Then, the protection determiner 67E instructs the MOS control circuit 68 to perform the protection operation for the power generator 1 due to the occurrence of a malfunction in the MOS transistor 60.

The protection determiner 67E also identifies that a malfunction has occurred in the MOS transistor 61 when receiving one of 1. The second information notified by the malfunction determiner 67D 2. The second indication pulse included in the third PWM signal Then, the protection determiner 67E instructs the MOS control circuit 68 to perform the protection operation for the power generator 1 due to the occurrence of a malfunction in the MOS transistor 61.

In addition, the protection determiner 67E identifies that a malfunction has occurred in a system, which includes the field winding 2, the MOS transistor 50, and other components, required to excite the field winding 2 when receiving the fourth PWM signal. The system required to excite the field winding 2 will be referred to as an excitation system hereinafter. Then, the protection determiner 67E instructs the MOS control circuit 68 to perform the protection operation for the power generator 1 due to the occurrence of a malfunction in the excitation system.

The MOS control circuit 68 is connected to the gate of each of the MOS transistors 60 and 61, each of the first and second temperature sensors 62 and 63, and the output end of the U-phase winding.

For example, the MOS control circuit 68 can be designed as a microcomputer unit (programmed logic unit) comprised of at least a CPU and a memory. As another example, the MOS control circuit 68 can be designed as a hardware circuit or as a hardware/software hybrid circuit.

The MOS control circuit 68, which serves as a rectifying unit, calculates the RPM Na of the rotor 2M based on, for example, the frequency of at least one of the first and second PWM signals generated by the PWM signal generator 67A. The MOS control circuit 68, which serves as a rectifying unit, also performs synchronous rectification that alternately turns on and off the MOS transistors 60 and 61 according to timings determined based on the calculated RPM Na of the rotor 2M. An example of a method for performing the synchronous rectification is described in, for example, U.S. Pat. No. 8,570,004, whose applicant is the same as this application, corresponding to Japanese Patent Application Publication No. 2011-151903. The disclosure of the U.S. Patent is incorporated entirely herein by reference.

The MOS control circuit 68 also performs a task for limiting the power-generation operations by the power generator 1 when instructed by the protection determiner 67E; the task will be referred to as a power-generation limiting task hereinafter. An example of the power-generation limiting task is described in, for example, U.S. Pat. No. 8,710,807, whose applicant is the same as this application, corresponding to Japanese Patent Application Publication No. 2012-090454. The disclosure of the U.S. Patent is incorporated entirely herein by reference.

For example, when instructed by the protection determiner 67E to perform the protection operation for the power generator 1 due to the occurrence of a malfunction in the upper-arm MOS transistor 60 of the rectifier module 41, the MOS control circuit 68 of the rectifier module 41 performs, as the power-generation limiting task, a first power-generation limiting task to (1) Turn on or keep on the upper-arm MOS transistors 60 of all the rectifier modules 41 to 43

(2) Turn off or keep off the lower-am MOS transistors 61 of all the rectifier modules 41 to 43

(3) Instruct the communication circuit 67 to transmit the third PWM signal including the first identification pulse and the third identification pulse to the communication line RC.

Execution of the first power-generation limiting task results in the output ends of the U-, V-, and W-phase windings being substantially short-circuited, and the U-, V-, and W-phase currents flowing through the respective U-, V-, and W-phase windings having substantially the same amplitudes. Execution of the first power-generation limiting task also results in an effective value of each of the U-, V-, and W-phase currents being smaller than that of the U-phase current when there is a malfunction in the upper-arm. MOS transistor 60 of the rectifier module 41 without execution of the first power-generation limiting task.

When instructed by the protection determiner 67E to perform the protection operation for the power generator 1 due to the occurrence of a malfunction in the upper-arm MOS transistor 60 of another one of the rectifier modules 42 and 43 based on the third PWM signal sent via the communication line RC, the MOS control circuit 68 of the corresponding rectifier module 42 or 43 performs the first power-generation limiting task in a like manner as the MOS control circuit 68 of the rectifier module 41.

In addition, when instructed by the protection determiner 67E to perform the protection operation for the power generator 1 due to the occurrence of a malfunction in the lower-arm MOS transistor 61 of the rectifier module 41, the MOS control circuit 68 of the rectifier module 41 performs, as the power-generation limiting task, a second power-generation limiting task to (1) Turn on or keep on the lower-arm MOS transistors 61 of all the rectifier modules 41 to 43

(2) Turn off or keep off the upper-am MOS transistors 60 of all the rectifier modules 41 to 43

(3) Instruct the communication circuit 67 to transmit the third PWM signal including the first identification pulse and the second identification pulse to the communication line RC.

Execution of the second power-generation limiting task results in the output ends of the U-, V-, and W-phase windings being substantially short-circuited, and the U-, V-, and W-phase currents flowing through the respective U-, V-, and W-phase windings having substantially the same amplitudes. Execution of the first power-generation limiting task also results in an effective value of each of the U-, V-, and W-phase currents being smaller than that of the U-phase current when there is a malfunction in the lower-arm MOS transistor 61 of the rectifier module 41 without execution of the second power-generation limiting task.

When instructed by the protection determiner 67E to perform the protection operation for the power generator 1 due to the occurrence of a malfunction in the lower-arm MOS transistor 61 of another one of the rectifier modules 42 and 43 based on the third PWM signal sent via the communication line RC, the MOS control circuit 68 of the corresponding rectifier module 42 or 43 performs the second power-generation limiting task in a like manner as the MOS control circuit 68 of the rectifier module 41.

When instructed by the protection determiner 67E to perform the protection operation in response to receiving the fourth PWM signal, the MOS control circuit 68 is capable a performing one of the first and second power-generation limiting tasks.

Note that, when instructed by the protection determiner 67E to perform the protection operation in response to receiving the fourth PWM signal, it is preferred that the MOS control circuit 68 should determine timings at each of which the MOS control circuit 68 performs the first or second power-generation limiting task to turn on or off all the upper-arm MOS transistors 60 and turn off or on all the lower-arm switching elements 61 such that no surges likely occur at each of the timings.

More preferably, the MOS control circuit 68E should control execution timings of the first or second power-generation limiting task to prevent on/off operations of the upper- or lower-arm MOS transistor 60 or 61 while a certain amount of current, i.e., a large amount of current, is about to flow or is flowing through the corresponding upper- or lower-arm MOS transistor 60 or 61. This control reduces the risk of a surge occurring due to on/off operations of the MOS transistors 60 and 61.

Figure 8:
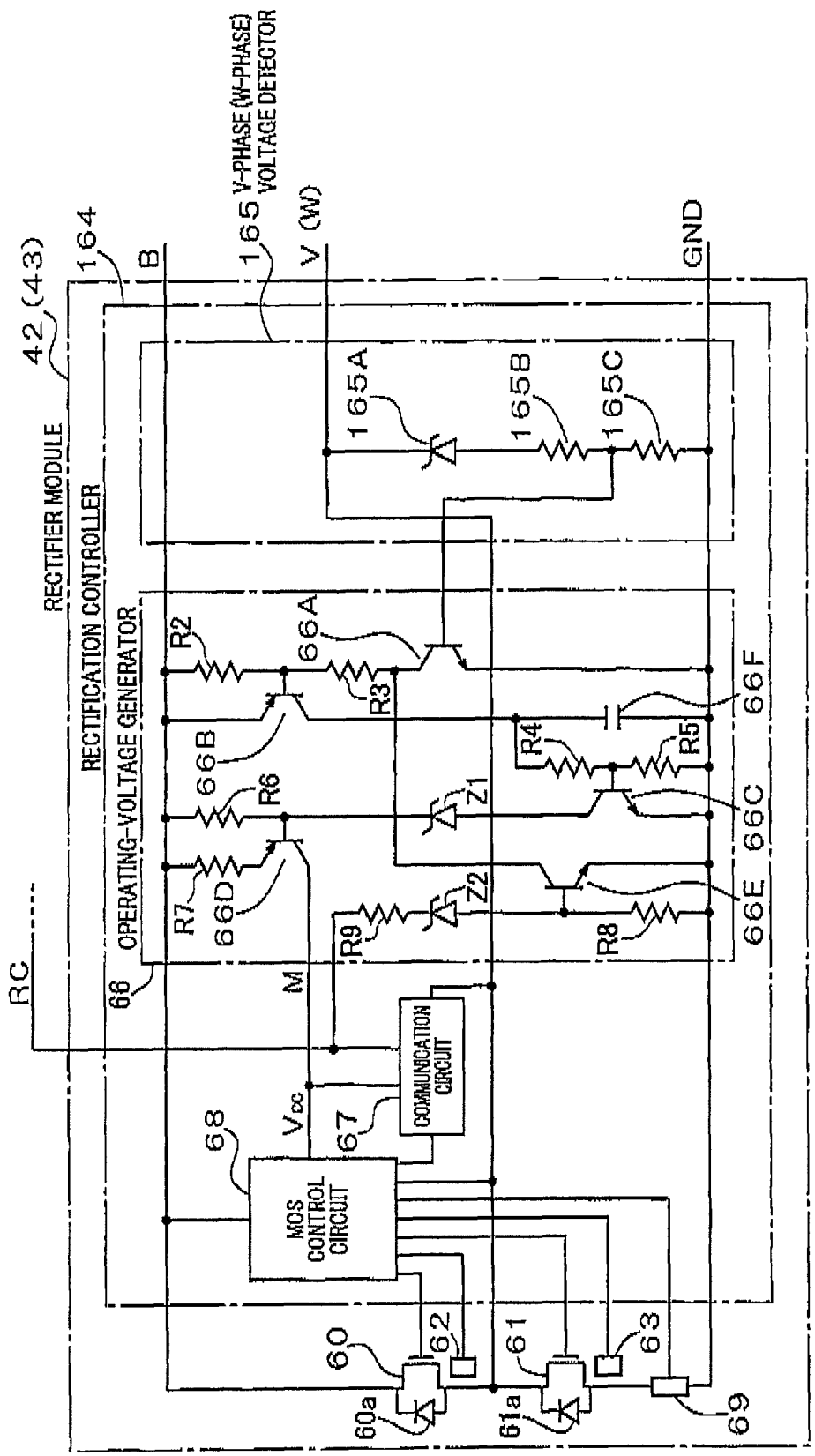
FIG. 8 is a circuit diagram schematically illustrating an example of the structure of a rectifier module for each of V- and W-phase windings illustrated in FIG. 1.

The structure of each of the rectifier modules 42 and 43 is similar to that of the rectifier module 41. Specifically, referring to FIG. 8, the rectifier module 42 for the V-phase winding includes first and second MOS transistors 60 and 61, first and second temperature sensors 62 and 63, a rectification controller 164, and a current sensor 69. The first and second MOS transistors 60 and 61, the first and second temperature sensors 62 and 63, and the current sensor 69 included in the rectifier module 42 differ from those included in the rectifier module 41 in the following point. Specifically, the components 60 to 64 and 69 included in the rectifier module 42 are operatively associated with the V-phase winding, but the components 60 to 64 and 69 included in the rectifier module 41 are operatively associated with the U-phase winding. Thus, the operations of the components 60 to 64 and 69 included in the rectifier module 42 are substantially identical to those of the components 60 to 64 and 69 included in the rectifier module 41, so that detailed descriptions of the components 60 to 64 and 69 included in the rectifier module 42 are omitted.

The rectification controller 164 includes, for example, a V-phase voltage detector 165, an operating-voltage generator 66, a communication circuit 67, and a MOS control circuit 68. The structures and operations of the operating-voltage generator 66, communication circuit 67, and MOS control circuit 68 included in the rectification controller 164 are substantially identical to those of the operating-voltage generator 66, communication circuit 67, and MOS control circuit 68 included in the rectification controller 64. For this reason, descriptions of the substantially identical parts 66, 67, and 68 between the rectification controllers 64 and 164, to which identical reference characters are assigned, are omitted.

From the rectification controller 64, the rectification controller 164 differs only in that the U-phase voltage detector 65 is replaced with a V-phase voltage detector 165. Thus, identical components between the rectification controllers 64 and 164, to which identical reference numerals are assigned, are omitted in description.

The V-phase voltage detector 165 is operative to measure a V-phase voltage Vv at the output end of the V-phase winding. For example, the V-phase voltage detector 165 includes a Zener diode 165A and series-connected resistors 165B and 165C. The anode of the Zener diode 165A is connected to a first end of the series-connected resistors 165B and 165C, the cathode of the Zener diode 165A is connected to the output end of the V-phase winding, and a second end, opposite to the first end, of the series-connected resistors 165B and 165C is connected to the common signal ground of the power generator 1. A connection point between the resistors 165B and 165C is connected to the base of the transistor 66A.

Adjustment of the Zener voltage of the Zener diode 155A and resistances of the respective resistors 165B and 165C makes it possible to turn on the transistor 66A each time a V-phase voltage Vv at the output end of the V-phase winding Vv exceeds the second PWM voltage Vth2. That is, the transistor 66A of the operating-voltage generator 66 is configured to be intermittently turned on.

The rectifier module 43 for the W-phase winding has substantially the same structure as that of the rectifier module 42, so that detailed descriptions of the rectifier module 43 are omitted.

Next, an example of the structure of the regulator 5 will be described in detail hereinafter.

Figure 9:
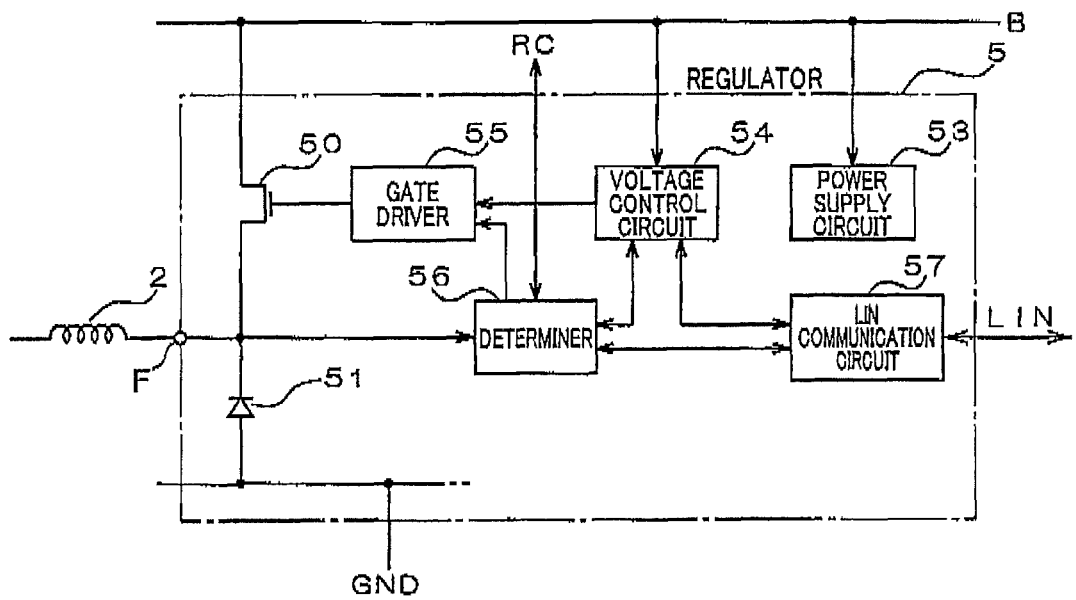
FIG. 9 is a circuit diagram schematically illustrating an example of the structure of a regulator illustrated in FIG. 1.

Referring to FIG. 9, the regulator 5 has the terminal F, and includes a MOS transistor 51, a flywheel diode 51, a power supply circuit 53, a voltage control circuit 54, a gate driver 55, a determiner 56, and a LIN communication circuit 57.

The drain of the MOS transistor 50 is connected to the output terminal B of the power generator 1, and the source is connected to a first end of the field winding 2 via the terminal F so that the MOS transistor 50 is connected in series to the field winding 2.

The anode of the flywheel diode 51 is connected to the common signal ground of the power generator 1, and the cathode is connected to the first end of the field winding 2 via the terminal F. A second end, opposite to the first end, of the field winding 2 is connected to the common signal ground of the power generator 1, so that the flywheel diode 51 is connected in parallel to the field winding 2.

The LIN communication circuit 57 is operative to carry out serial bidirectional communications, i.e., LIN communications in accordance with the LIN protocols, with the ECU 8. The LIN communication circuit 57 is capable of receiving, as communication messages, instructions including a power-generation start instruction and pieces of data including data indicative of for example, the target regulated voltage Vreg sent from the ECU 8.

The power supply circuit 53 is connected to the output terminal B of the power generator 1, and connected to each element of the regulator 5. The power supply circuit 53 is operative to supply an operating voltage to each element of the regulator 5 based on the voltage at the output terminal B of the power generator 1.

The voltage control circuit 54 is connected the LIN communication circuit 57, the output terminal B of the power generator 1, the gate driver 55, and the determiner 56.

The voltage control circuit 54 performs various tasks including an initial excitation task, a normal power-generation start task, a normal power-generation control task, and a power-generation limiting task.

For example, the voltage control circuit 54 performs the initial excitation task in response to when the LIN communication circuit 57 receives the power-generation start instruction.

The initial excitation task is designed to determine a controllable duty factor for cyclically performing on-off operations of the MOS transistor 50. That is, the MOS transistor 50 controlled by the determined duty factor causes the excitation current supplied to the field winding 2 to have a value, such as 0.5 A, less than a predetermined value of the excitation current; the predetermined value of the excitation current is supplied to the field winding 2 while the power generator 1 is performing the normal power-generation operations. Execution of the initial excitation task results in the amplitude of each of U-, V-, and W-phase voltages, which is induced by rotation of the rotor 2M, being greater than that of a corresponding one of U-, V-, and W-phase voltages, which is induced by rotation of the rotor 2M based on only a remanent magnetization in the poles of the rotor 2M. This makes it possible for the rectifier module 41 to detect rotation of the rotor 2M even if the rotational speed of the rotor 2M is within a lower range as compared with a case where the rectifier module 41 detects rotation of the rotor 2M based on only a remanent magnetization in the poles of the rotor 2M.

When the determiner 56 detects the first PWM signal output from the rectifier module 41 to the communication line RC while the voltage so control circuit 54 is performing the initial excitation task, the voltage control task 54 switches the initial excitation task to the normal power-generation start task. Then, the voltage control circuit 54 performs the normal power-generation start task that increases the excitation current supplied to the field winding 2.

When the determiner 56 detects the first PWM signal output from the rectifier module 41 to the communication line RC while no initial excitation task is being performed, the voltage control circuit 54 starts the normal power-generation start task that starts the supply of an excitation current to the field winding 2.

Thereafter, when the determiner 56 detects the second PWM signal output from one of the rectifier modules 41 to 43 to the communication line RC, the voltage control circuit 54 switches the normal power-generation start task to the normal power-generation control task. The normal power-generation control task compares the output voltage Vb of the power generator 1, which is the voltage at the output terminal B of the power generator 1, with the target regulated voltage Vreg sent from the ECU 8 via the LIN communication circuit 57. For example, the voltage control circuit 54 outputs a high level signal when the target regulated voltage Vreg is equal to or higher than the output voltage Vb of the power generator 1, and outputs a low level signal when the target regulated voltage Vreg is lower than the output voltage Vb of the power generator 1. In order to suppress a steep change in an output current of the power generator 1, the voltage controller 54 can control the gate driver 55 to gradually change the amount of the excitation current supplied to the field winding 2 per switching cycle of the MOS transistor 50.

The gate driver 55 generates a PWM signal that is a cyclic pulse signal having a controllable duty factor determined depending on the output, i.e. the compared result, of the voltage control circuit 54. That is while the MOS transistor 50 is on, the excitation current is supplied to flow through the field winding 2 based on the output voltage Vb, and during the MOS transistor 50 off, no excitation current is supplied to flow through the field winding 2. Thus, the amount, i.e., an averaged value, of the excitation current flowing through the field winding 2 per switching cycle of the MOS transistor 50 can be adjusted by the duty factor, and therefore, the output voltage Vb is feedback controlled based on the adjusted amount of the excitation current.

When the determiner 56 detects the third PWM signal output from one of the rectifier modules 41 to 43 to the communication line RC, or the determiner 56 determines that a malfunction has occurred in the excitation system, the voltage control circuit 54 performs the power-generation limiting task. The power-generation limiting task adjusts the duty factor for the MOS transistor 50 to thereby reduce the amount of the excitation current supplied to the field winding 2 per switching cycle of the MOS transistor 50 or stop the supply of the excitation current to the field winding 2.

The determiner 56 is connected to the connection point among the MOS transistor 50, the gate driver 55, the field winding 2, and the flywheel diode 51, to the LIN communication circuit 57, to the communication line RC, and to the voltage control circuit 54. As described above, the determiner 56 detects each of the first to third PWM signals when a corresponding one of the first to third PWM signals is transmitted via the communication line RC. The determiner 56 calculates the RPM Na of the rotor 2M based on, for example, the frequency of at least one of the first and second PWM signals detected thereby. The determiner 56 also monitors how the U-, V-, and W-phase voltages are generated based on the second PWM signals sent from the respective rectifier modules 41, 42, and 43. The determiner 56 further determines whether there is a malfunction in at least one of the rectifier modules 41 to 43 based on the third PWM signal sent from a corresponding at least one of the rectifier modules 41 to 43.

In addition, the determiner 56 monitors a voltage VF at the terminal F or a current flowing through the terminal F to thereby determine whether a malfunction has occurred in the excitation system, such as a short-circuit malfunction across the MOS transistor 50, and a short-circuit malfunction across the field winding 2. When determining that a malfunction has occurred in the excitation system, the determiner 56 generates the fourth PWM signal indicative of the occurrence of a malfunction in the excitation system set forth above, and transmits the fourth PWM signal to the communication line RC.

Figure 10:
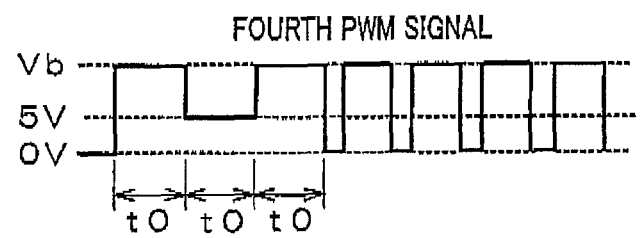
FIG. 10 is a view schematically illustrating an example of a fourth PWM signal generated by the communication circuit.

FIG. 10 illustrates an example of the fourth PWM signal. The fourth PWM signal illustrated in FIG. 10 holds the output voltage Vb for the duration t0, thereafter holds a predetermined voltage, such as 5 V, lower than the output voltage Vb for the next duration t0, and thereafter holds the output voltage Vb during the next duration t0. After lapse of the last duration t0, the fourth PWM signal is designed as a pulse signal having a constant cycle of t0 and a predetermined duty factor.

Note that the determiner 56 can generate the third PWM signal including the second identification pulse or the third identification pulse illustrated in FIG. 7 in place of the fourth. PWM signal.

Particularly, the determiner 56 is configured to generate the fourth PWM signal when the LIN communication 57 receives an instruction for performing the power-generation limiting task set forth above or an instruction for generating torque, and transmit the fourth PWM signal to the communication line RC. This configuration permits the ECU 8 to instruct via the regulator 5 each of the rectifier modules 41 to 43 to perform the power-generation limiting task or a task, referred to as a torque generation task, for generating torque while preventing an excessive rise in the output voltage Vb of the power generator 1 rectified by the rectifier 4 without additional wires between the regulator 5 and the ECU 8. The torque generation task controls the power-generation operations by the power generator 1 to thereby adjust torque serving as a load to rotation of the rotor 2, i.e., the crankshaft of the engine. Adjustment of the torque, referred to as load torque, can forcibly stop rotation of the crankshaft of the engine at a desired position.

Figure 11:
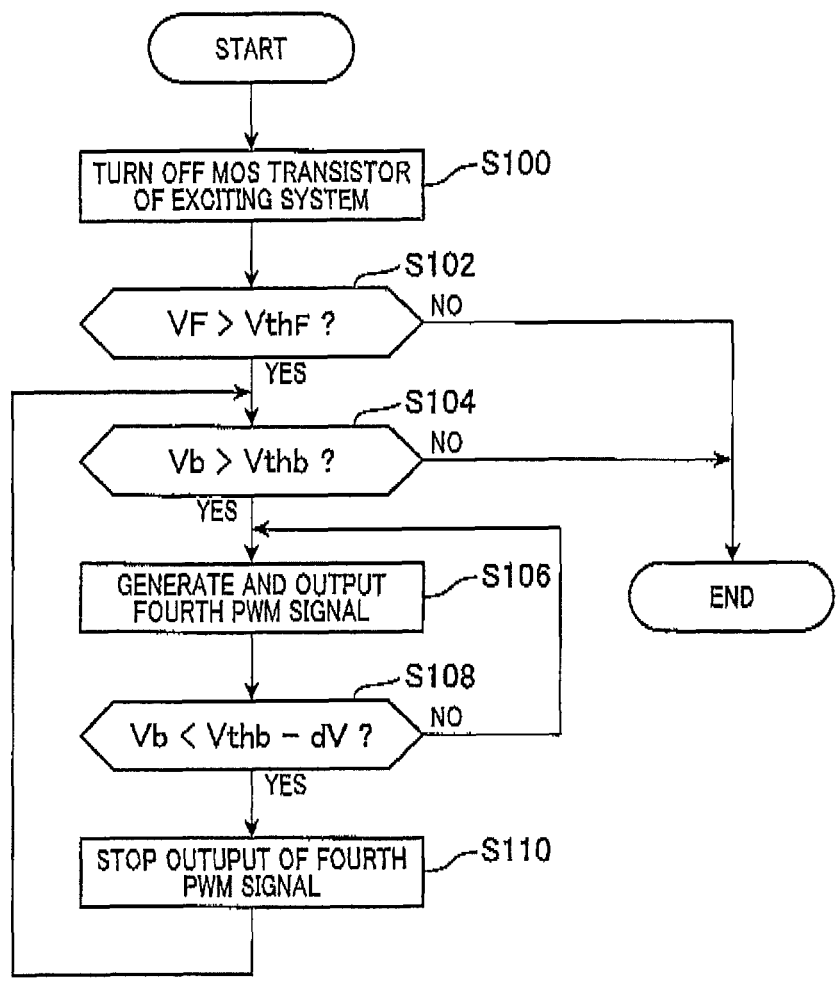
FIG. 11 is a flowchart schematically illustrating an example of a short-circuit malfunction detecting routine carried out by a determiner of the regulator illustrated in FIG. 9.

Next, an example of how the determiner 56 determines whether a short-circuit malfunction has occurred in the MOS transistor 50, and transmits the fourth PWM signal to the communication line RC will be described hereinafter with reference to FIG. 11. For example, the determiner 56 cyclically performs a short-circuit malfunction detecting routine including a set of instructions illustrated in FIG. 11.

Specifically, the determiner 56 instructs the gate driver 55 to perform a turnoff operation of the MOS transistor 50 for turning off the MOS transistor 50 in step S100, and determines whether the monitored voltage VF at the terminal F is higher than a predetermined threshold voltage VthF in step S102. The threshold voltage Vth is to determine whether the voltage VF at the terminal F falls normally after transmission of the turnoff instruction to the gate driver 55, in other words, whether the MOS transistor 50 is continuously on due to its short-circuit malfunction in spite of the turnoff operations of the MOS transistor 50 by the gate driver 55 so that the voltage VF at the terminal F keeps to be higher than the threshold voltage VthF.

When determining that the monitored voltage VF at the terminal F is equal to or lower than the threshold voltage VthF (NO in step S102), the determiner 56 terminates the short-circuit malfunction detecting routine.

Otherwise, when determining that the monitored voltage VF at the terminal F is higher than the threshold voltage VthF (YES in step S102), the determiner 56 determines whether the output voltage Vb is higher than a predetermined threshold voltage Vthb in step S104. The threshold voltage Vthb is to determine whether the output voltage Vb is an overvoltage due to the short-circuit of the MOS transistor 50.

When determining that the output voltage Vb is equal to or lower than the threshold voltage Vthb (NO in step S104), the determiner 56 terminates the short-circuit malfunction detecting routine.

Otherwise, when determining that the output voltage Vb is higher than the threshold voltage Vthb (YES in step S104), the determiner 56 generates the fourth PWM signal, and outputs the fourth PWM signal to the communication line RC in step S106.

Next, the determiner 56 determines whether the output voltage Vb is lower than a threshold voltage (Vthb−dV) while continuously outputting the fourth PWM signal to the communication line RC in step S108. The threshold voltage (Vthb−dV) is set to be lower than the threshold voltage Vthb by value dV.

When determining that the output voltage Vb is kept to be equal to or higher than the threshold voltage (Vthb−dV) (NO in step S108), the determiner 56 returns to step S106, and continuously outputs the fourth PWM signal in step S106.

Otherwise, when determining that the output voltage Vb is lower than the threshold voltage (Vthb−dV) (YES in step S108), the determiner 56 stops the output of the fourth PWM signal to the communication line RC in step S110. After the operation in step S110, the determiner returns to step S104, and determines whether the output voltage Vb is higher than the threshold voltage Vthb.

The LIN communication circuit 57 is capable of outputting, to the ECU 8, information indicative of the RPM Na of the rotor 2M calculated by the determiner 56, and information indicative of how each of the U-, V-, and W-phase voltages is generated. The LIN communication circuit 57 is also capable of outputting, when a malfunction has occurred in the MOS transistor 60 or 61 included in one of the rectifier modules 41 to 43 so that the determiner 56 has determined the third PWM signal, a signal including (1) The occurrence of such a malfunction in the MOS transistor 60 or 61 included in one of the rectifier modules 41 to 43

(2) Where such a malfunction has occurred.

As described above, the regulator 5 of the power converter 1 according to the first embodiment is configured to start excitation of the field winding 2 to cause the power generator 1 to start normal power-generation operations when 1. Receiving the power-generation start instruction sent from the ECU 8 via the LIN communication circuit 57

2. Receiving the first PWM signal sent from the rectifier module 41 via the LIN communication circuit 57.

This configuration eliminates the need to directly connect the output end of each of the stator windings 3 to the regulator 5; the output end of each of the stator windings 3 has a high risk of superimposition of surges due to switching of the transistors included in the rectifier modules 41 to 43. This elimination prevents the regulator 5 from malfunctioning due to such surges.

One of typical regulators is designed to determine that a corresponding power generator has shifted into a mode in which the power generator is performing normal power-generation operations when a phase voltage output from each phase stator winding exceeds a threshold voltage, i.e., an intermediate value. The threshold voltage is previously set within a voltage range from a value defined as the subtraction of 10 V from the half of a target regulated voltage to a value defined as the sum of 10 V and the half of the target regulated voltage. This design however may require adjustment of the intermediate voltages for the respective stator windings because how the intermediate voltages for the respective stator windings are generated may differ from each other.

In contrast, the regulator 5 of the power generator 1 is configured not to directly detect the phase voltages of the respective stator windings 3, and to determine whether the power generator 1 has shifted into a mode in which the power generator is performing normal power-generation operations according to the second PWM signals sent from the respective rectifier modules 41 to 43. This configuration therefore eliminates the need to adjust the second threshold voltages Vth2 corresponding to the intermediate voltages, thus improving the versatility of the regulator 5.

All the rectifier modules 41 to 43 and the regulator 5 are connected to each other via the communication line RC, and the power generator 1 is configured to prevent the first or second PWM signal from simultaneously being output to the communication line RC from each of at least two different rectifier modules. This configuration prevents PWM signals output from other rectifier modules from colliding with each other on the communication line RC, thus the regulator 5 reliably detecting the PWM signals output from all the rectifier modules 41 to 43.

Each of the rectifier modules 41 to 43 is configured to output the third PWM signal, which differs from the first and second PWM signals, to the other rectifier modules and the regulator 5 via the common communication line RC when a malfunction has occurred in the MOS transistor 60 or 61 of the corresponding rectifier module. This configuration makes it possible for each rectifier module to inform, via the common communication line RC, the other rectifier modules and the regulator 5 of both information indicative of the corresponding phase voltage and the calculated rotational speed of the rotor 2M and information indicative of the occurrence of a malfunction in the MOS transistor 60 or 61.

Each of the rectifier modules 41 to 43 is configured to, after receiving the second PWM signal sent from another rectifier module, (1) Determine whether a short-circuit malfunction has occurred across the upper-am MOS transistor 60 when determines that the value of the phase voltage at the output end of a corresponding phase winding connected thereto is equal to or higher than the first reference value for the first predetermined period (2) Determine whether a short-circuit malfunction has occurred across the lower-am MOS transistor 61 when determines that the value of the phase voltage at the output end of a corresponding phase winding connected thereto is equal to or lower than the second reference value for the second predetermined period.

This configuration makes it possible for each rectifier module to reliably determine whether and where a short-circuit malfunction has occurred therein.

Each of the rectifier modules 41 to 43 is configured to generate the third PWM signal and output it to the other rectifier modules and the regulator 5 via, the communication line RC when one or more malfunctions have occurred therein; the one or more malfunctions include a malfunction due to abnormal change in the temperature of at least one of the MOS transistors 60 and 61, and a malfunction due to a short circuit across at least one of the MOS transistors 60 and 61. This enables one of the other rectifier modules or the regulator 5 to address one or more measures against the one or more malfunctions.

Each of the rectifier modules 41 to 43 is configured to be activated based on the operating voltage Vcc generated when the voltage at the output end of a corresponding phase winding connected thereto is equal to or higher than the threshold voltage Vr or one of the first to third PWM signals sent from another rectifier module is input thereto via the communication line RC.

This configuration makes it possible for each rectifier module to be activated to based on the input of one of the first to third PWM signals sent from another rectifier module even if the corresponding phase voltage does not rise due to a malfunction of the MOS transistor 60 or 61. This activation of each rectifier module permits the rectifier module to detect the malfunction.

If a malfunction has occurred in the upper-arm MOS transistor 60 ort the lower-arm MOS transistor 61 in a rectifier module, the rectifier module is configured to (1) Transmit the third PWM signal to the regulator 5 so that the regulator 5 performs the power-generation limiting task to reduce the amount of the excitation current supplied to the field winding 2 per switching cycle of the MOS transistor 50

(2) Turn on or keep on the upper- or lower-arm MOS transistors of all the rectifier modules 41 to 43 corresponding to the malfunctioned MOS transistor while turning or keeping off all the other-arm MOS transistors of all the rectifier modules 41 to 43.

The reduction in the excitation current supplied to the field winding 2 prevents overheat in the malfunctioned MOS transistor.

In addition, this configuration results in the output ends of the U-, V-, and W-phase windings being substantially short-circuited, and the U-, V-, and W-phase currents flowing through the respective U-, V-, and W-phase windings having substantially same amplitudes. This prevents an overcurrent from concentratedly flowing through the malfunctioned MOS transistor.

The regulator 5 is configured to generate the fourth PWM signal and output it to the communication line RC when determining that a malfunction has occurred in the excitation system. Each of the first to third rectifier modules 41 to 43 is configured to turn on of keep on the upper- or lower-arm MOS transistor while turning or keeping off the other-arm MOS transistor when receiving the fourth PWM signal. These configurations prevent the output voltage Vb rectified by the rectifier 4 from excessively increasing even if a short-circuit malfunction has occurred across the MOS transistor 50 through which the excitation current is supplied to the field winding 2.

Each of the rectifier modules 41 to 43 is configured to turn on or keep on the upper- or lower-arm MOS transistor while turning or keeping off all the other-arm MOS transistor to thereby limit power-generation operations at each of predetermined timings when no surges likely occur. For example, each of the rectifier modules 41 to 43 is configured to turn on or keep on the upper- or lower-arm MOS transistor while turning or keeping off all the other-arm MOS transistor to thereby limit power-generation operations at each of predetermined timings when no or little current is flowing through the lower-arm MOS transistor. This configuration prevents the ECU 8 and the electrical loads 10 from malfunctioning due to surges.

Second Embodiment

A power generator 1A according to the second embodiment of the present disclosure will be described hereinafter with reference to FIGS. 12 and 13.

The structure and/or functions of the power generator 1A according to the second embodiment axe different from those of the power generator 1 according to the first embodiment by the following points. So, the different points will be mainly described hereinafter, and therefore, redundant descriptions of like parts between the first and second embodiments, to which like reference characters are assigned, are omitted or simplified.

In the first embodiment, all the rectifier modules 41 to 43 and the regulator 5 are communicably connected to each other via the communication line RC.

Figure 12:
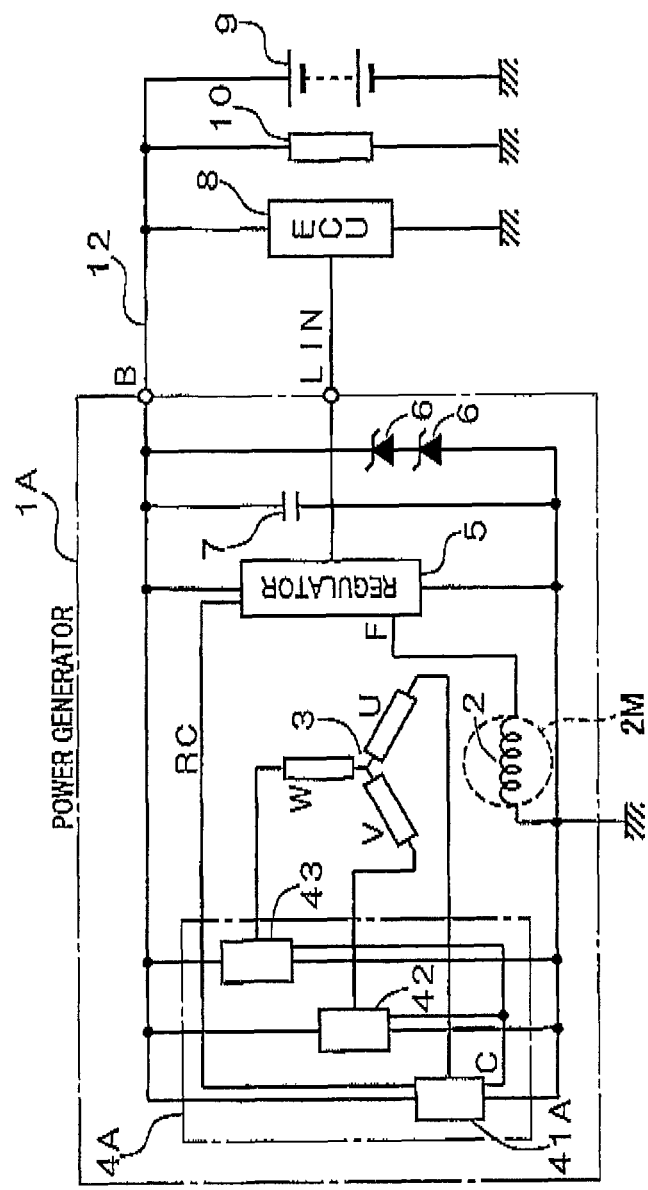
FIG. 12 is a circuit diagram schematically illustrating an example of the system configuration of a power generator according to the second embodiment of the present disclosure.
Figure 13:
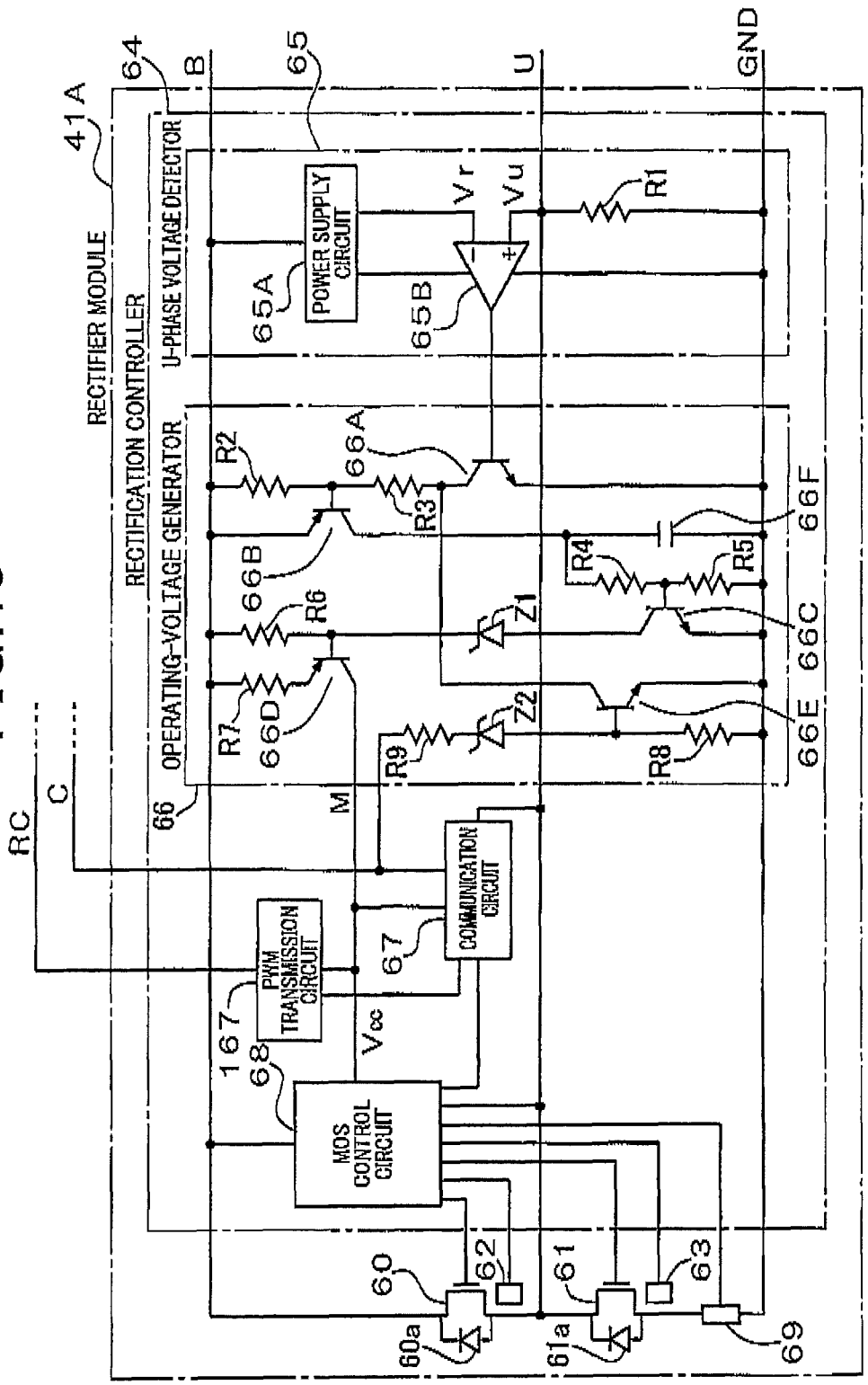
FIG. 13 is a circuit diagram schematically illustrating an example of the structure of a rectifier module for a U-phase winding illustrated in FIG. 12.

In contrast, the power generator 1A according to the second embodiment is configured such that a rectifier module 41A for the U-phase winding selected from the rectifier modules 41A, 42, and 43 is typically connected to the regulator 5 via the communication line RC, and the rectifier modules 41A, 42, and 43 are connected to each other via a communication line C serving as a second communication line (see FIG. 12).

The rectifier module 41A, which is typically connected to the regulator 5 via the communication line RC, additionally includes a PWM transmission circuit 167 connected between the communication line RC and a line connecting between the MOS control circuit 68 and the collector of the transistor 66D. The PWM transmission circuit 167 is connected to the communication circuit 67, and the communication circuit 67 is connected to the communication line C and the line connecting between the MOS control circuit 68 and the collector of the transistor 66D. In other words, the PWM transmission circuit 167 is inserted between the communication line RC and the communication circuits 67 of the rectifier modules 41 to 43 communicably connected to each other via the communication line C.

The communication circuit 67 outputs the first, second, or third PWM signal to the communication line C when the first, second, or third PWM signal is generated thereby. The PWM transmission circuit 167 of the rectifier module 41A receives the first, second, or third PWM signal being output through the communication line C, and transfers the first, second, or third PWM signal to the communication line RC to thereby transmit it to the regulator 5. In addition, the PWM transmission circuit 167 of the rectifier module 41A receives the third or fourth PWM signal being output through the communication line RC, and transfers the third or fourth PWM signal to the communication line C to thereby transmit it to the other rectifier modules 42 and 43.

This configuration of the power generator 1A prevents communications between the regulator 5 and the rectifier module 41A from conflicting with communications between the rectifier modules 41 to 43.

This configuration permits the third PWM signal output to the communication line RC to be used as an instruction to start the initial excitation task, i.e., a power-generation limiting task, to the regulator 5. That is, when the third PWM signal is output through the communication line RC, the regulator 5 performs the initial excitation task, i.e., the power-generation limiting task, to reduce the amount of the excitation current supplied to the field winding 2 per switching cycle of the MOS transistor 50 while rotation of the rotor 2M is stopped, and send a communication message indicative of for example, the occurrence of a malfunction in the MOS transistor 60 or 61.

Third Embodiment

A power generator 1B according to the third embodiment of the present disclosure will be described hereinafter with reference to FIGS. 14 and 15.

The structure and/or functions of the power generator 1B according to the third embodiment are different from those of the power generator 1 according to the first embodiment by the following points. So, the different points will be mainly described hereinafter, and therefore, redundant descriptions of like parts between the first and third embodiments, to which like reference characters are assigned, are omitted or simplified.

In the first embodiment, the power generator 1 includes the rectifier modules 41 to 43 provided for the respective phases of the stator windings 3.

Figure 14:
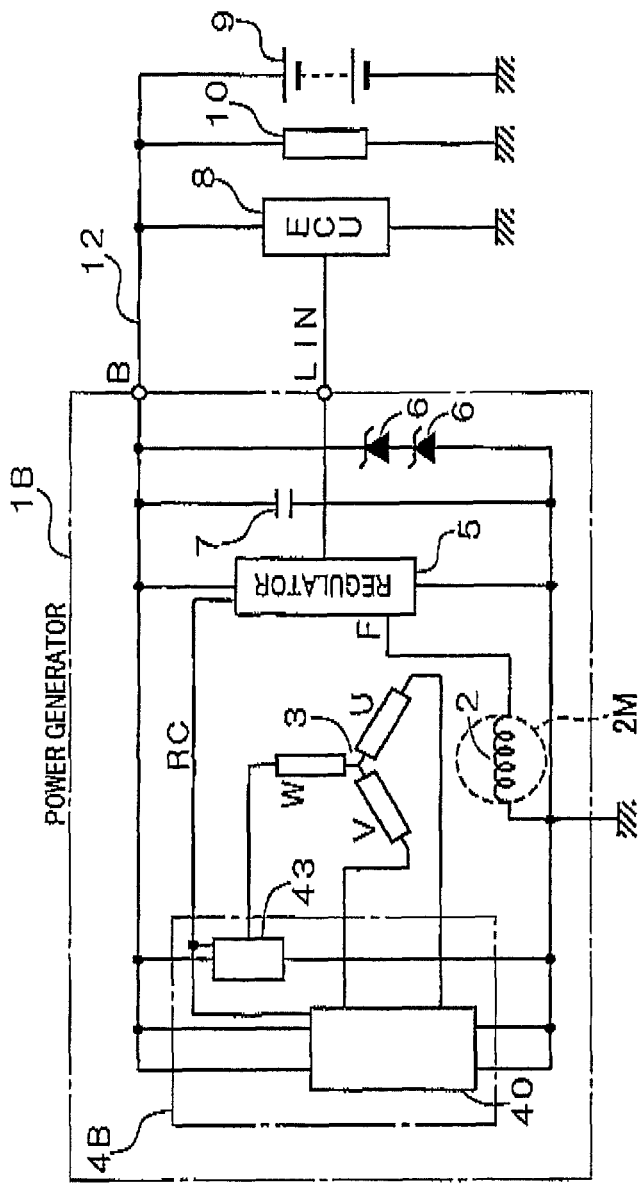
FIG. 14 is a circuit diagram, schematically illustrating an example of the system configuration of a power generator according to the third embodiment of the present disclosure.

In contrast, the power generator 1B includes a first rectifier module 40 for two-phase windings, i.e., the U- and V-phase windings, and the rectifier module 43 serving as a second rectifier module for the remaining phase winding, such as the W-phase winding (see FIG. 14).

Figure 15:
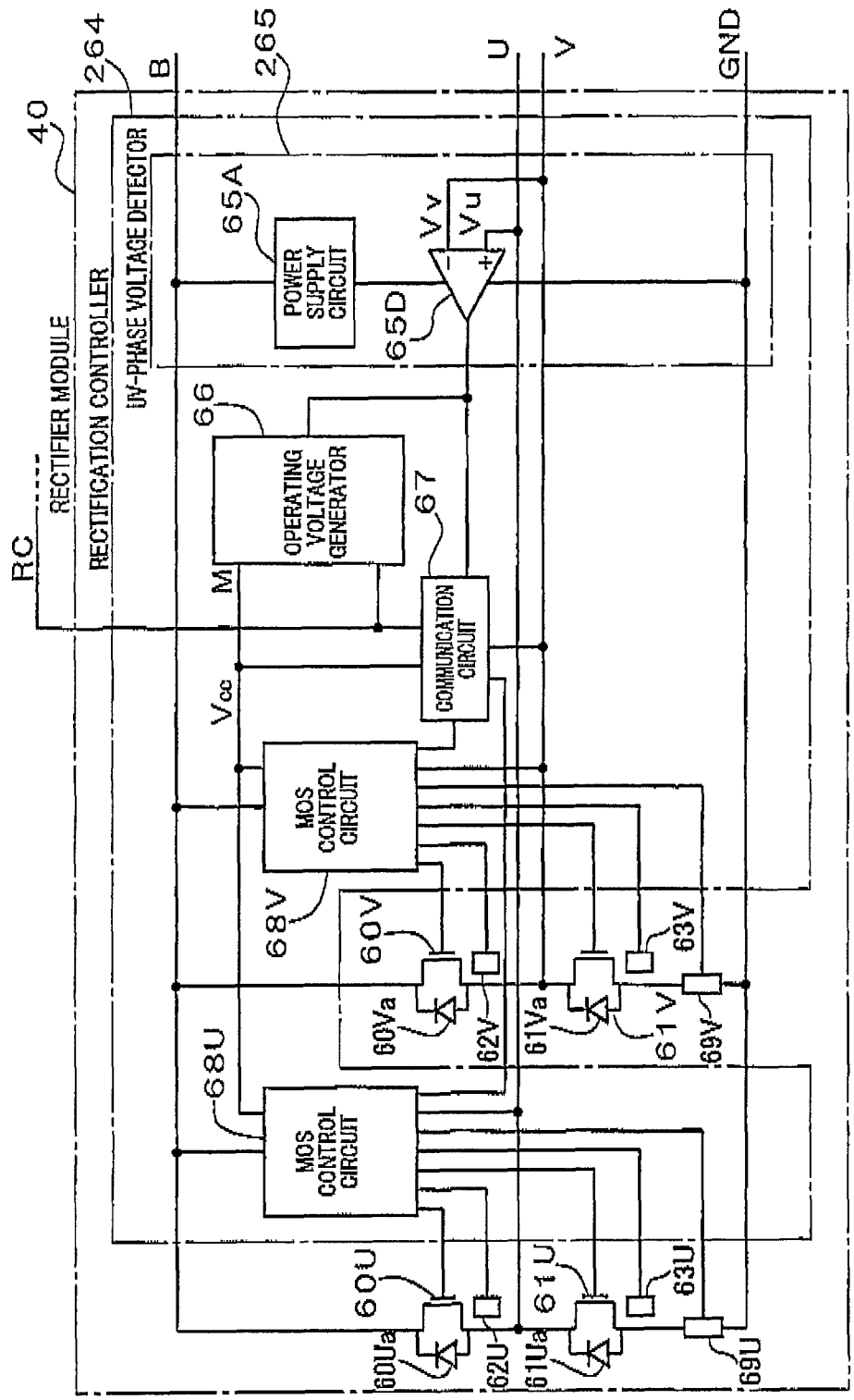
FIG. 15 is a circuit diagram schematically illustrating an example of the structure of a first rectifier module for U- and V-phase windings illustrated in FIG. 12.

Specifically, referring to FIG. 15, the first rectifier module 40 includes first and second MOS transistors 60U and 61U for the U-phase winding, first and second temperature sensors 62U and 63U for the U-phase winding, first and second MOS transistors 60V and 61V for the V-phase winding, first and second temperature sensors 62V and 63V for the V-phase winding, a rectification controller 264, a current sensor 69U for the U-phase winding, and a current sensor 69V for the V-phase winding.

The first and second MOS transistors 60U and 61U, first and second temperature sensors 62U and 63U, and current sensor 69U are substantially identical in configuration to the respective MOS transistors 60 and 61, temperature sensors 62 and 63, and current sensor 69 of the rectifier module 41 according to the first embodiment. The first and second MOS transistors 60V and 61V, first and second temperature sensors 62V and 63V, and current sensor 69V are substantially identical in configuration to the respective MOS transistors 60 and 61, temperature sensors 62 and 63, and current sensor 69 of the rectifier module 42 according to the first embodiment.

Reference characters 60Ua and 61Ua represent intrinsic diodes of the respective first and second MOS transistors 60U and 61U, and reference characters 60Va and 61Va represent intrinsic diodes of the respective first and second MOS transistors 60V and 61V.

The rectification controller 264 includes a first MOS control circuit 68U for the U-phase winding, and a second MOS control circuit 68V for the V-phase winding in place of the MOS control circuit 68.

The first MOS control circuit 68U is identical in configuration to the MOS control circuit 68 of the rectifier module 41 for the U-phase winding according to the first embodiment, and the second MOS control circuit 68V is identical in configuration to the MOS control circuit 68 of the rectifier module 42 for the V-phase winding according to the first embodiment.

The rectification controller 264 also includes a UV-phase voltage detector 265 in place of the U-phase voltage detector 65. The UV-phase voltage detector 265 includes a differential amplifier 65D in place of the voltage comparator 65B.

The differential amplifier 65D has a first input terminal connected to the output end of the U-phase winding, a second input terminal connected to the output end of the V-phase winding, and an output end connected to each of the operating-voltage generator 66 and the communication circuit 67.

The differential amplifier 65D operates, based on the operating voltage supplied from the power supply circuit 65A, to amplify the difference, i.e., a U-V line voltage, of the V-phase voltage Vv from the U-phase voltage Vu, and send the amplified difference, i.e., the amplified U-V line voltage, to each of the operating-voltage generator 66 and the communication circuit 67.

Inputting the amplified U-V line voltage, which is higher than a predetermined voltage, to the operating-voltage generator 66 causes the operating-voltage generator 66 to perform operations to generate the operating voltage Vcc in the same manner as the operating-voltage generator 66 according to the first embodiment.

The PWM signal generator 67A of the communication circuit 67 generates each of the first and second PWM signals for the U-phase winding using the amplified U-V line voltage. The PWM signal generator 67A of the communication circuit 67 also generates each of the first and second PWM signals for the V-phase winding using the amplified U-V line voltage.

This configuration of the power converter 18 generates the first and second PWM signals for each of the U- and V-phase windings using the amplified U-V line voltage. This configuration reduces, on the first and second PWM signals, adverse effects due to the fluctuations of U- and/or V-phase voltages Vu and Vv due to leak currents and other factors. This configuration results in high-accuracy detection of rotation of the rotor 2M based on the U-V line voltage without additional wires.

The present disclosure is not limited to the aforementioned embodiments, and can be modified within the scope of the present disclosure.

Each of the power generators 1, 1A, and 1B according to the respective first to third embodiments is provided with a single set of the stator winding 3 and a single set of the rectifier modules 41 to 43 provided for the respective stator windings 3, but the present disclosure is not limited thereto. Specifically, each of the power generators 1, 1A, and 1B can be provided with at least two sets of the stator windings 3 end corresponding at least two sets of the rectifier modules 41 to 48; the rectifier modules 41 to 43 of each of the at least two sets are provided for the stator windings 3 of a corresponding one of the at least two sets.

The first to third embodiments use the star-connected three-phase stator windings 3, but can use a single-phase stator winding, multiphase stator windings, delta-connected multiphase stator windings, or star-delta connected multiphase stator windings.

Each of the first to third rectifier modules according to the first to third embodiments can use a half-bridge circuit comprised of a diode as an upper-arm rectifying member in place of the upper-arm MOS transistor 60 and the lower-arm MOS transistor 61 serving as a switch, or a half-bridge circuit composed of the upper-arm MOS transistor 60 serving as a switch and a diode as a lower-arm rectifying element in place of the lower-am MOS transistor 61. That is, it is sufficient for each of the first to third rectifier modules according to the first to third embodiments to include at least one switch.

The PWM signal generator 67A of each of the rectifier modules 41 to 43 according to the first to third embodiments generates the second PWM signal for notifying the regulator 5 or another rectifier module of information representing that the corresponding power generator has started normal power-generation operations. However, the present disclosure is not limited to the configuration.

Specifically, the PWM signal generator 67A of each of the rectifier modules 41 to 43 according a modification can generate a modified second PWM signal with a duty factor that changes depending on the temperature of for example, a selected one of the MOS transistors 60 and 61.

Figure 16:
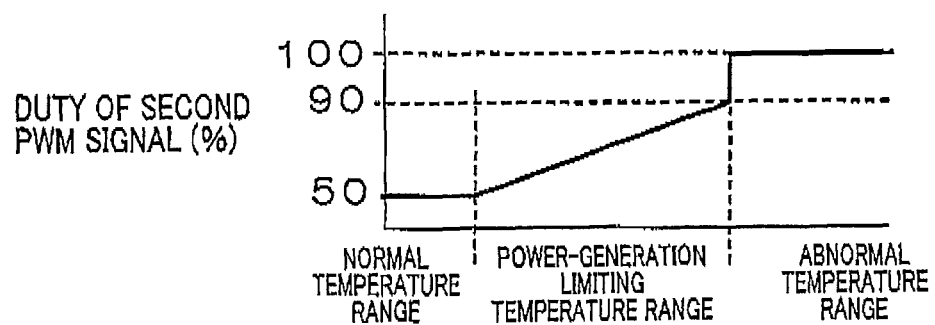
FIG. 16 is a graph schematically illustrating an example of the relationship between duty factor of the second PWM signal and temperature of a selected one of MOS transistors of a rectifier module according to a modification of each of the first to third embodiments.

Specifically, referring to FIG. 16, the duty factor of the modified second PWM signal is set to 50% when no temperature malfunctions have occurred in the selected MOS transistor, in other words, the temperature of the selected MOS transistor is located within a normal temperature range. The duty factor of the modified second PWM signal changes within the range from 50% to 90% in proportion to the temperature of the selected MOS transistor when the temperature of the selected MOS transistor is located within a range that necessitates limitation of the power-generation operations. The duty factor of the modified second PWM signal is set to 100% when a temperature malfunction has occurred in the selected MOS transistor, in other words, the temperature of the selected MOS transistor is located within an abnormal temperature range. The modified second PWM signal can include a first pulse whose duty cycle changes depending on the temperature of the MOS transistor 60 in accordance with FIG. 16, and a second pulse whose duty cycle changes depending on the temperature of the MOS transistor 61 in accordance with FIG. 16.

Generating the modified second PWM signal being transmitted to the regulator 5 permits the regulator 5 to perform the power-generation limiting task set forth above without additional wires between the regulator 5 and each of the rectifier modules 41 to 43. For example, the regulator 5 is capable of gradually reducing the amount of the excitation current supplied to the field winding 2 per switching cycle of the MOS transistor 50 depending on gradual increase of the temperature of the selected MOS transistor.

The PWM signal generator 67A of each of the rectifier modules 41 to 43 according to the first to third embodiments generates the second PWM signal having a pulse height, i.e., a voltage variation range, that is different from the pulse height of the first PWM signal, but the present disclosure is not limited thereto.

Figure 17:
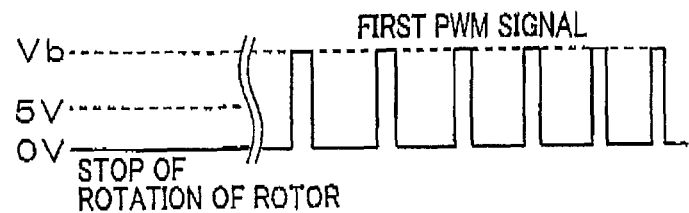
FIG. 17 is a view schematically illustrating an example of a first PWM signal generated by the communication circuit according to another modification of each of the first to third embodiments.

Specifically, the PWM signal generator 67A of each of the rectifier modules 41 to 43 according to another modification can generate a modified second PWM signal with a duty factor that differs from the duty factor of the first PWM signal. For example, referring to FIG. 17, the PWM signal generator 67A of each of the rectifier modules 41 to 43 according to this modification can generate the first PWM signal with the high level being set to the output voltage Vb, a duty factor of a value, such as 25%, lower than a duty factor of 50%, and generate the second PWM signal having the duty factor of 50%. This configuration results in the first and second PWM signals being easily distinguishable.

In each of the first to third embodiments, the first to fourth PWM signals are an example of modulation signals each including at least one piece of information.

While the illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A rotary electric machine comprising:
a stator winding having an output end;
a rotor including an excitation winding;
a switch connected to the output end of the stator winding;
a modulation signal generator configured to:
   generate a modulation signal including information indicative of rotation of the rotor based on change of a voltage at the output end of the stator winding; and
   output the modulation signal; and
a rectifying unit configured to alternately turn on and off the switch to rectify the voltage at the output end of the stator winding, thus generating a rectified voltage; and
an excitation current supplying circuit communicably connected to the modulation signal generator via a communication line and configured to start a supply of an excitation current to the excitation winding of the rotor to induce a rotating magnetic field in the stator winding when the modulation signal output from the modulation signal generator is input thereto via the communication line,
wherein:
the modulation signal generator is configured to:
output a first modulation signal that is the modulation signal, the first modulation signal having a duty factor and a signal variation range;
monitor the output end of the stator winding;
generate a second modulation signal when a result of the monitor represents one of: the voltage at the output end of the stator winding becoming equal to or higher than a predetermined value; and detection of a current flowing through the output end of the stator winding; and
output the second modulation signal to the communication line;
the second modulation signal being a pulse signal having a duty factor and a signal variation range, at least one of the duty factor and the signal variation range of the second modulation signal differing from a corresponding at least one of the duty factor and the signal variation range of the first modulation signal, and
the excitation current supplying circuit is configured to:
start the supply of the excitation current to the excitation winding of the rotor when instructed externally; and
control the supply of the excitation current to the excitation winding of the rotor to stabilize the rectified voltage when the second modulation signal output from the modulation signal generator is input thereto,
the stator winding includes multiphase stator windings, each of the multiphase stator windings having an output end;
the switch includes a plurality of switches connected to the respective multiphase stator windings;
the modulation signal generator includes a plurality of modulation signal generators provided for the respective multiphase stator windings;
the plurality of modulation signal generators and the excitation current supplying circuit are communicably connected to each other via the communication line; and
only one of the plurality of modulation signal generators is configured to generate the first and second modulation signals, and output the first and second modulation signal to the communication line.

2. The rotary electric machine according to claim 1, wherein each of the plurality of modulation signal generators is configured to generate a third modulation signal, and output the third modulation signal to the excitation current supplying circuit and the other modulation signal generators when there is a malfunction in a corresponding one of the plurality of switches,
the third modulation signal differing from the first and second modulation signals, and including information indicative of at least an occurrence of the malfunction in a corresponding one of the plurality of switches.

3. The rotary electric machine according to claim 2, wherein:
each of the plurality of switches includes a first switching element and a second switching element; and
each of the plurality of modulation signal generators is configured to generate the third modulation signal when there is a malfunction in one of the first and second switching elements of a corresponding one of the plurality of switches,
the third modulation signal including second information indicative of whether the malfunction has occurred in the first switching element or the second switching element of a corresponding one of the plurality of switches.

4. The rotary electric machine according to claim 3, wherein:
each of the plurality of modulation signal generators is configured to:
determine that there is a short-circuit malfunction, as the malfunction, across the first switching element of a corresponding one of the plurality of switches when the second modulation signal is input thereto from an alternative one of the plurality of modulation signal generators, and the voltage at the output terminal of a corresponding one of the plurality of stator windings is equal to or higher than a first reference value for a first predetermined period; and
determine that there is a short-circuit malfunction, as the malfunction, across the second switching element of a corresponding one of the plurality of switches when the second modulation signal is input thereto from an alternative one of the plurality of modulation signal generators, and the voltage at the output terminal of a corresponding one of the plurality of stator windings is equal to or lower than a second reference value for a second predetermined period.

5. The rotary electric machine according to claim 3, wherein
each of the plurality of modulation signal generators is configured to:
generate the third modulation signal when there is a short-circuit malfunction that is the malfunction across one of the first and second switching elements of a corresponding one of the plurality of switches; and
generate the third modulation signal when there is a temperature malfunction that is the malfunction in one of the first and second switching elements of a corresponding one of the plurality of switches.

6. The rotary electric machine according to claim 3, wherein, when the third modulation signal is input to the excitation current supplying circuit is configured to:
notify an external circuit of information indicative of an occurrence of a malfunction; and
reduce a value of the excitation current supplied to the excitation winding of the rotor; and the rectifying unit includes a plurality of rectifying units each configured to alternately turn on or off the first switching element and the second switching element of a corresponding one of the plurality of switches, each of the plurality of rectifying units being configured to turn on a selected one of the first switching element and the second switching element of a corresponding one of the plurality of switches while turning off the other thereof, the malfunction having occurred in the selected one of the first switching element and the second switching element.

7. The rotary electric machine according to claim 6, wherein:

the excitation current supplying circuit includes an excitation system for supplying the excitation current, and is configured to cause the excitation system to control the supply of the excitation current to the excitation winding of the rotor to thereby adjust the rectified voltage to a target regulated voltage, and is configured to:

generate a fourth modulation signal when the rectified voltage becomes higher than a predetermined threshold voltage due to a malfunction in the excitation system, the predetermined threshold voltage being set to be higher than the target regulated voltage; and output the fourth modulation signal to the communication line; and each of the plurality of rectifying units is configured to turn on a selected one of the first switching element and the second switching element of a corresponding one of the plurality of switches while turning off the other thereof.

8. The rotary electric machine according to claim 6, wherein each of the plurality of rectifying units is configured to determine a timing that turns on the selected one of the first switching element and the second switching element of a corresponding one of the plurality of switches while turning off the other thereof such that no surges are likely to occur at the determined timing.

9. The rotary electric machine according to claim 6, wherein the excitation current supplying circuit is configured to output the fourth modulation signal to the communication line when a predetermined instruction indicative of output of the fourth modulation signal is input thereto.

10. The rotary electric machine according to claim 1, further comprising:

a plurality of activating circuits each configured to activate a corresponding one of the plurality of modulation signal generators when one of a first condition and a second condition is satisfied, the first condition being that one of the first and second modulation signals is input thereto from an alternative one of the plurality of modulation signal generators, the second condition being that the voltage at the output end of a corresponding one of the plurality of stator windings becomes higher than a predetermined threshold voltage.

11. The rotary electric machine according to claim 1, wherein the multiphase windings include at least a first stator winding and a second stator winding;

the plurality of switches include at least a first switch connected to the output terminal of the first stator winding, and a second switch connected to the output terminal of the second stator winding;

the rectifying unit is configured to alternately turn on and off each of the first switch and the second switch to rectify the voltage at the output end of each of the first and second stator windings, thus generating the rectified voltage; and only one of the plurality of modulation signal generators is configured to detect a line voltage between the voltage at the output end of the first stator winding and the voltage at the output end of the second stator winding, and generate the modulation signal including the information indicative of rotation of the rotor based on change of the line voltage.

12. The rotary electric machine according to claim 1, wherein: only one of the plurality of modulation signal generators is configured to modify the second modulation signal depending on a temperature of a corresponding one of the plurality of switches such that the modified second modulation signal includes change of the temperature of a corresponding one of the plurality of switches, and output the modified second modulation signal as the second modulation signal to the communication line; and the excitation current supplying circuit is configured to control the supply of the excitation current to the excitation winding of the rotor according to the change of the temperature of corresponding one of the plurality of switches input thereto via the communication line.

13. A rotary electric machine comprising:

a stator winding having an output end;

a rotor including an excitation winding;

switch connected to the output end of the stator winding;

a modulation signal generator configured to:

generate a modulation signal including information indicative of rotation of the rotor based on change of a voltage at the output end of the stator winding; and output the modulation signal; and a rectifying unit configured to alternately turn on and off the switch to rectify the voltage at the output end of the stator winding, thus generating a rectified voltage; and an excitation current supplying circuit communicably connected to the modulation signal generator via a communication line and configured to start a supply of an excitation current to the excitation winding of the rotor to induce a rotating magnetic field in the stator winding when the modulation signal output from the modulation signal generator is input thereto via the communication line, wherein:

the modulation signal generator is configured to:

output a first modulation signal that is the modulation signal, the first modulation signal having a duty factor and a signal variation range;

monitor the output end of the stator winding;

generate a second modulation signal when a result of the monitor represents one of: the voltage at the output end of the stator winding becoming equal to or higher than a predetermined value; and detection of a current flowing through the output end of the stator winding; and output the second modulation signal to the communication line;

the second modulation signal being a pulse signal having a duty factor and a signal variation range, at least one of the duty factor and the signal variation range of the second modulation signal differing from a corresponding at least one of the duty factor and the signal variation range of the first modulation signal, and the excitation current supplying circuit is configured to:

start the supply of the excitation current to the excitation winding of the rotor when instructed externally;

control the supply of the excitation current to the excitation winding of the rotor to stabilize the rectified voltage when the second modulation signal output from the modulation signal generator is input thereto, the stator winding includes multiphase stator windings, each of the multiphase stator windings having an output end;

the switch includes a plurality of switches connected to the respective multiphase stator windings;

the modulation signal generator includes a plurality of modulation signal generators provided for the respective multiphase stator windings;

one of the plurality of modulation signal generators is communicably connected to the excitation current supplying circuit via a first communication line that is the communication line; and one of the plurality of modulation signal generators is communicably connected to remaining modulation signal generators in the plurality of modulation signal generators via a second communication line differing from the first communication line.

14. The rotary electric machine according to claim 13, wherein each of the plurality of modulation signal generators is configured to generate a third modulation signal, and output the third modulation signal to the excitation current supplying circuit and the other modulation signal generators when there is a malfunction in a corresponding one of the plurality of switches, the third modulation signal differing from the first and second modulation signals, and including information indicative of at least an occurrence of the malfunction in a corresponding one of the plurality of switches.

15. The rotary electric machine according to claim 14, wherein:

each of the plurality of switches includes a first switching element and a second switching element; and each of the plurality of modulation signal generators is configured to generate the third modulation signal when there is a malfunction in one of the first and second switching elements of a corresponding one of the plurality of switches, the third modulation signal including second information indicative of whether the malfunction has occurred in the first switching element or the second switching element of a corresponding one of the plurality of switches.

16. The rotary electric machine according to claim 15, wherein:

each of the plurality of modulation signal generators is configured to:

determine that there is a short-circuit malfunction, as the malfunction, across the first switching element of a corresponding one of the plurality of switches when the second modulation signal is input thereto from an alternative one of the plurality of modulation signal generators, and the voltage at the output terminal of a corresponding one of the plurality of stator windings is equal to or higher than a first reference value for a first predetermined period; and determine that there is a short-circuit malfunction, as the malfunction, across the second switching element of a corresponding one of the plurality of switches when the second modulation signal is input thereto from an alternative one of the plurality of modulation signal generators, and the voltage at the output terminal of a corresponding one of the plurality of stator windings is equal to or lower than a second reference value for a second predetermined period.

17. The rotary electric machine according to claim 15, wherein each of the plurality of modulation signal generators is configured to:

generate the third modulation signal when there is a short-circuit malfunction that is the malfunction across one of the first and second switching elements of a corresponding one of the plurality of switches; and generate the third modulation signal when there is a temperature malfunction that is the malfunction in one of the first and second switching elements of a corresponding one of the plurality of switches.

18. The rotary electric machine according to claim 13, further comprising:

a plurality of activating circuits each configured to activate a corresponding one of the plurality of modulation signal generators when one of a first condition and a second condition is satisfied, the first condition being that one of the first and second modulation signals is input thereto from an alternative one of the plurality of modulation signal generators, the second condition being that the voltage at the output end of a corresponding one of the plurality of stator windings becomes higher than a predetermined threshold voltage.

19. The rotary electric machine according to claim 15, wherein, when the third modulation signal is input to the excitation current supplying circuit is configured to:

notify an external circuit of information indicative of an occurrence of a malfunction; and reduce a value of the excitation current supplied to the excitation winding of the rotor; and the rectifying unit includes a plurality of rectifying units each configured to alternately turn on or off the first switching element and the second switching element of a corresponding one of the plurality of switches, each of the plurality of rectifying units being configured to turn on a selected one of the first switching element and the second switching element of a corresponding one of the plurality of switches while turning off the other thereof, the malfunction having occurred in the selected one of the first switching element and the second switching element.

20. The rotary electric machine according to claim 19, wherein:

the excitation current supplying circuit includes an excitation system for supplying the excitation current, and is configured to cause the excitation system to control the supply of the excitation current to the excitation winding of the rotor to thereby adjust the rectified voltage to a target regulated voltage, and is configured to:

generate a fourth modulation signal when the rectified voltage becomes higher than a predetermined threshold voltage due to a malfunction in the excitation system, the predetermined threshold voltage being set to be higher than the target regulated voltage; and output the fourth modulation signal to the communication line; and each of the plurality of rectifying units is configured to turn on a selected one of the first switching element and the second switching element of a corresponding one of the plurality of switches while turning off the other thereof.

21. The rotary electric machine according to claim 19, wherein each of the plurality of rectifying units is configured to determine a timing that turns on the selected one of the first switching element and the second switching element of a corresponding one of the plurality of switches while turning off the other thereof such that no surges are likely to occur at the determined timing.

22. The rotary electric machine according to claim 19, wherein the excitation current supplying circuit is configured to output the fourth modulation signal to the communication line when a predetermined instruction indicative of output of the fourth modulation signal is input thereto.

23. The rotary electric machine according to claim 13, wherein multiphase windings include at least a first stator winding and a second stator winding;
   the plurality of switches include at least a first switch connected to the output terminal of the first stator winding, and a second switch connected to the output terminal of the second stator winding;
   the rectifying unit is configured to alternately turn on and off each of the first switch and the second switch to rectify the voltage at the output end of each of the first and second stator windings, thus generating the rectified voltage; and
   only one of the plurality of modulation signal generators is configured to detect a line voltage between the voltage at the output end of the first stator winding and the voltage at the output end of the second stator winding, and generate the modulation signal including the information indicative of rotation of the rotor based on change of the line voltage.

24. The rotary electric machine according to claim 13, wherein:
   one of the plurality of modulation signal generators is configured to modify the second modulation signal depending on a temperature of a corresponding one of the plurality of switches such that the modified second modulation signal includes change of the temperature of a corresponding one of the plurality of switches, and output the modified second modulation signal as the second modulation signal to the communication line; and
   the excitation current supplying circuit is configured to control the supply of the excitation current to the excitation winding of the rotor according to the change of the temperature of a corresponding one of the plurality of switches input thereto via the communication line.

\* \* \* \* \*